(12) United States Patent
O'Neill et al.

(10) Patent No.: US 10,644,962 B2
(45) Date of Patent: May 5, 2020

(54) CONTINUOUS MONITORING FOR PERFORMANCE EVALUATION OF SERVICE INTERFACES

(71) Applicant: APImetrics Inc., Seattle, WA (US)

(72) Inventors: David O'Neill, Seattle, WA (US); Paul Michael Cray, Preston (GB); Nicholas John Denny, Seattle, WA (US)

(73) Assignee: APImetrics Inc., Seattle, WA (US)

( * ) Notice: Subject to any disclaimer, the term of this patent is extended or adjusted under 35 U.S.C. 154(b) by 36 days.

(21) Appl. No.: 16/191,328

(22) Filed: Nov. 14, 2018

(65) Prior Publication Data
US 2019/0149424 A1    May 16, 2019

Related U.S. Application Data

(60) Provisional application No. 62/586,774, filed on Nov. 15, 2017.

(51) Int. Cl.
| | |
|---|---|
| *H04L 12/24* | (2006.01) |
| *G06F 9/48* | (2006.01) |
| *G06F 11/00* | (2006.01) |
| *H04L 12/26* | (2006.01) |
| *H04L 29/08* | (2006.01) |
| *H04L 29/06* | (2006.01) |

(52) U.S. Cl.
CPC ............ *H04L 41/14* (2013.01); *G06F 9/4843* (2013.01); *G06F 11/00* (2013.01); *H04L 43/50* (2013.01); *H04L 43/08* (2013.01); *H04L 67/10* (2013.01); *H04L 67/42* (2013.01)

(58) Field of Classification Search
CPC ......... H04L 41/14; H04L 43/08; H04L 43/50; H04L 67/62; G06F 9/4843
See application file for complete search history.

(56) References Cited

U.S. PATENT DOCUMENTS

| | | | | |
|---|---|---|---|---|
| 8,782,557 | B2* | 7/2014 | Dernis ................. | G06F 3/0482 715/790 |
| 9,077,479 | B2* | 7/2015 | Kotrla ................. | H04L 41/5019 |
| 9,521,052 | B1* | 12/2016 | Nandyalam ............ | H04L 43/08 |
| 9,576,031 | B1* | 2/2017 | Aggarwal ........... | G06F 16/2455 |
| 9,766,947 | B2* | 9/2017 | Wang ................... | G06F 9/5083 |
| 9,904,560 | B2* | 2/2018 | Cooper .................. | G06F 9/546 |
| 10,091,086 | B2* | 10/2018 | Prabhakar .............. | H04L 43/14 |
| 10,304,349 | B1* | 5/2019 | Stickle .................... | G09B 7/02 |

(Continued)

*Primary Examiner* — Lashonda T Jacobs
(74) *Attorney, Agent, or Firm* — John W. Branch; Lowe Graham Jones PLLC

(57) ABSTRACT

Embodiments are directed to monitoring for service interfaces. Accordingly, test agent engines may provide a first and a second set of raw data associated with Application Programming Interfaces (APIs) to a test scheduling engine. The test scheduling engine may transform the first and second set of raw data into a first and a second set of reduced data. A quality score engine may aggregate ordinal ranks for the APIs based on the first set of reduced metric data, such that each of the ordinal rankings may be associated with various characteristics of the reduced data. Each of the APIs may be ranked based on their aggregations of the ordinal ranks. A quality score may be provided based on a mapping of the ranked APIs to a distribution model. A second quality score may be generated based on the mapping and the second set of reduced data.

30 Claims, 12 Drawing Sheets

(56) References Cited

U.S. PATENT DOCUMENTS

| | | | |
|---|---|---|---|
| 10,346,281 B2* | 7/2019 | Maheshwari | G06F 11/3082 |
| 2004/0064552 A1* | 4/2004 | Chong | G06F 11/3006 |
| | | | 709/224 |
| 2004/0139186 A1* | 7/2004 | Lee | G06F 11/3409 |
| | | | 709/223 |
| 2005/0188262 A1* | 8/2005 | Rosenman | G06F 11/2294 |
| | | | 714/25 |
| 2011/0270966 A1* | 11/2011 | Zhou | H04L 41/0213 |
| | | | 709/224 |
| 2013/0275585 A1* | 10/2013 | Santhanakrishnan | |
| | | | G06F 11/3476 |
| | | | 709/224 |
| 2015/0128103 A1* | 5/2015 | Stratton | G06F 8/00 |
| | | | 717/100 |
| 2016/0105328 A1* | 4/2016 | Cooper | G06F 9/54 |
| | | | 715/736 |
| 2016/0277264 A1* | 9/2016 | Zarn | H04L 67/22 |
| 2016/0300142 A1* | 10/2016 | Feller | G06Q 10/06395 |
| 2017/0199902 A1* | 7/2017 | Mishra | G06F 16/2465 |
| 2018/0253373 A1* | 9/2018 | Mathur | G06F 11/3688 |
| 2018/0329812 A1* | 11/2018 | Friedenberg | G06F 11/3688 |

\* cited by examiner

| | Latency 712 | Outlier Frequency 714 | Cloud services used 716 | Ranking Metric 718 |
|---|---|---|---|---|
| GetCurrentTime 706 | 598 ms | 1 per week | 5 | 1st |
| ListDirectories 708 | 717 ms | 2 per week | 13 | 5th |
| ListFiles 710 | 675 ms | 1 per Month | 2 | Last |

*Fig. 7*

CONTINUOUS MONITORING FOR PERFORMANCE EVALUATION OF SERVICE INTERFACES

CROSS-REFERENCE TO RELATED APPLICATIONS

This application is a Utility Patent application based on previously filed U.S. Provisional Patent Application U.S. Ser. No. 62/586,774, filed on Nov. 15, 2017, the benefit of the filing date of which is hereby claimed under 35 U.S.C. § 119(e) and which is further incorporated in entirety by reference.

TECHNICAL FIELD

The invention relates generally to monitoring performance and quality of web application programming interfaces (APIs), and more particularly, but not exclusively, to a method for comparative API quality monitoring using a single blended quality metric.

BACKGROUND

Web Application Program Interfaces (APIs) allow data and information to be conveniently supplied by serving computers to requesting computers. Both the serving and requesting computers use networking and web technologies, such as, Hypertext Transfer Protocol (HTTP), Hypertext Markup Language (HTML), eXtensible Markup Language (XML), JavaScript Object Notation (JSON), or the like, to exchange data and information. In order to maximize the efficiency and to optimize the performance of these APIs, operators often put in place management systems that monitor every aspect of web API performance.

API performance can be measured in many ways—latency, throughput, consistency, availability, resiliency, scalability, etc. However, the large number of metrics, as well as the large amount of data collected over time, makes it difficult to intuit which APIs are functioning well and which are performing poorly.

Moreover, measuring performance of individual web APIs can be misleading. For example, testing an API in isolation, from within a datacenter, loses context and the overall effect experienced by an end user. Furthermore, testing in isolation can cause errors to be missed. An HTTP response code 200 nominally indicates success, but such a response may have a semantic error, such as an empty search result when a non-empty search result is expected. Thus, it is with respect to these considerations and others that the present invention has been made.

BRIEF DESCRIPTION OF THE DRAWINGS

Non-limiting and non-exhaustive embodiments of the present innovations are described with reference to the following drawings. In the drawings, like reference numerals refer to like parts throughout the various figures unless otherwise specified. For a better understanding of the described innovations, reference will be made to the following Detailed Description of Various Embodiments, which is to be read in association with the accompanying drawings, wherein:

FIG. 7 shows a matrix of raw metrics captured for a plurality of APIs;

DETAILED DESCRIPTION OF THE VARIOUS EMBODIMENTS

Figure 1:
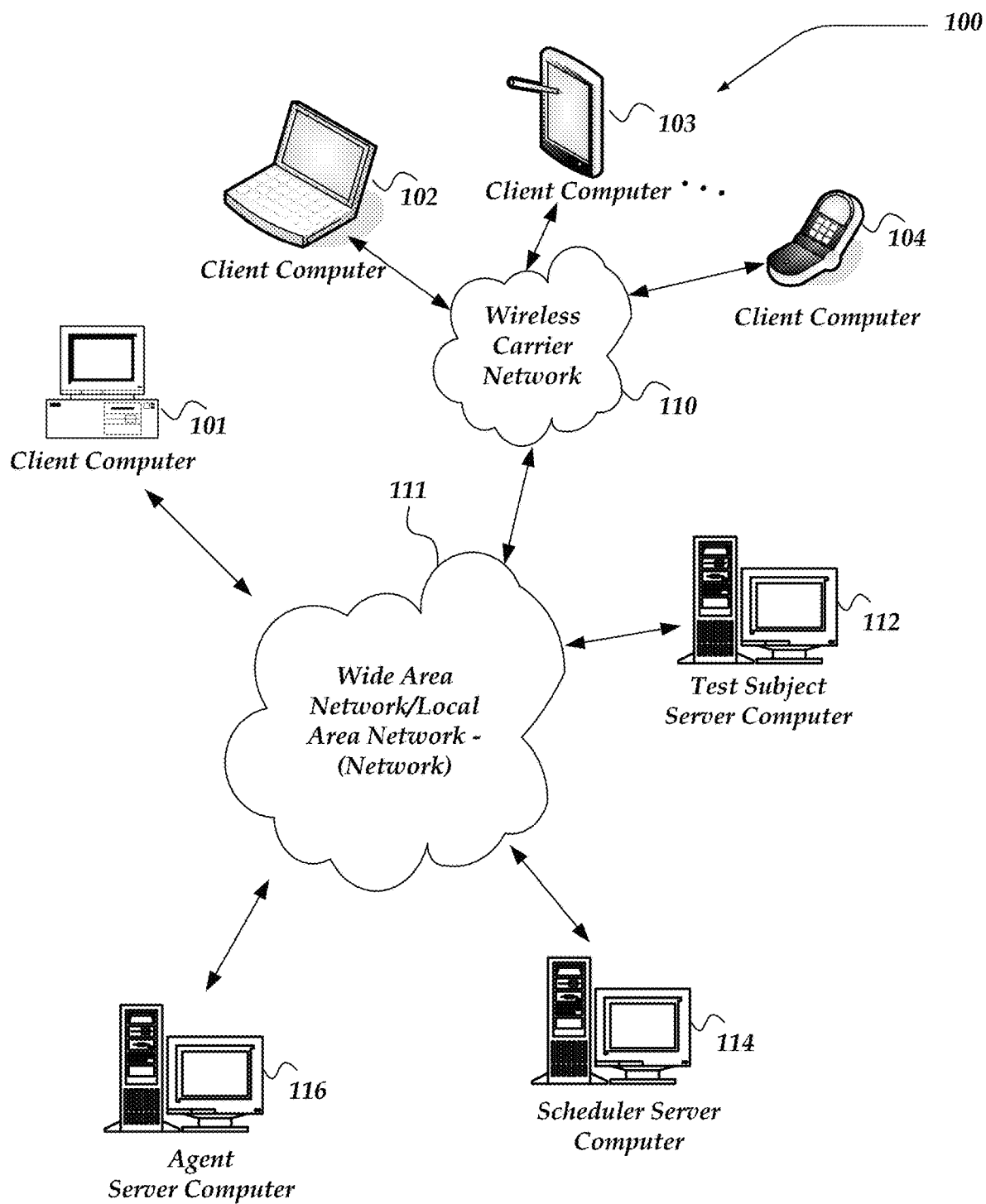
FIG. 1 shows components of one embodiment of an environment in which embodiments of the invention may be practiced.

Various embodiments now will be described more fully hereinafter with reference to the accompanying drawings, which form a part hereof, and which show, by way of illustration, specific exemplary embodiments by which the invention may be practiced. The embodiments may, however, be embodied in many different forms and should not be construed as limited to the embodiments set forth herein; rather, these embodiments are provided so that this disclosure will be thorough and complete, and will fully convey the scope of the embodiments to those skilled in the art. Among other things, the various embodiments may be methods, systems, media or devices. Accordingly, the various embodiments may take the form of an entirely hardware embodiment, an entirely software embodiment or an embodiment combining software and hardware aspects. The following detailed description is, therefore, not to be taken in a limiting sense.

Throughout the specification and claims, the following terms take the meanings explicitly associated herein, unless the context clearly dictates otherwise. The phrase "in one embodiment" as used herein does not necessarily refer to the same embodiment, though it may. Furthermore, the phrase "in another embodiment" as used herein does not necessarily refer to a different embodiment, although it may. Thus, as described below, various embodiments may be readily combined, without departing from the scope or spirit of the invention.

In addition, as used herein, the term "or" is an inclusive "or" operator, and is equivalent to the term "and/or," unless the context clearly dictates otherwise. The term "based on" is not exclusive and allows for being based on additional factors not described, unless the context clearly dictates otherwise. Also, throughout the specification and the claims, the use of "when" and "responsive to" do not imply that associated resultant actions are required to occur immediately or within a particular time period. Instead they are used herein to indicate actions that may occur or be performed in response to one or more conditions being met, unless the context clearly dictates otherwise. In addition, throughout the specification, the meaning of "a," "an," and "the" include plural references. The meaning of "in" includes "in" and "on."

For example embodiments, the following terms are also used herein according to the corresponding meaning, unless the context clearly dictates otherwise.

The term "outlier" as used herein refers to an API call that has a much longer than expected latency. For an API with normally distributed latencies, only 1% of calls would be expected to have a latency more than 3 standard deviations from the norm, but in practice more calls are observed with long latencies.

The term "raw metric data" as used herein refers to information about an invocation of an API as it is captured without having been modified, smoothed, interpolated, or otherwise altered.

The term "reduced metric data" as used herein refers to information about an invocation of an API that has been altered, typically for the purpose of aggregating multiple types of information in order to perform a calculation on the aggregation. For example, two types of information such as "latency" and "throughput" have different dimensions, and in particular, low latency is preferred while high throughput is desired. One non-limiting reduction is to perform an inverse operation on one of the two types of data, such that a higher (or lower) reduced metric of both metrics is desired.

The term "metric type" as used herein refers to a dimension in which a metric is measured. For example, latency has a metric type of duration, typically measured in milliseconds, while a number of cloud services used is a dimensionless number.

The term "modality" as used herein in the context of a "multi-modality API" refers to a number of clusters of API metrics that are formed. For example, an API with a normal distribution of latency has a single modality. However, an API with latencies that are typically 20 ms, but 25% of the time are 100 ms, may be considered bi-modal.

The term "distribution model" refers to a line or curve that fits one or more metrics of a test API. Non-limiting examples include Gaussian (or "normal") distributions, linear distributions, bi-modal distributions, skewed Gaussian distribution, or the like.

The term "cluster" as used herein refers to outliers in close proximity to one another.

The following briefly describes the embodiments of the invention in order to provide a basic understanding of some aspects of the invention. This brief description is not intended as an extensive overview. It is not intended to identify key or critical elements, or to delineate or otherwise narrow the scope. Its purpose is merely to present some concepts in a simplified form as a prelude to the more detailed description that is presented later.

Briefly stated, various embodiments are directed to continuous monitoring for performance evaluation of service interfaces. In one or more of the various embodiments, one or more test agent engines may be employed to provide a first and a second set of raw metric data associated with one or more Application Programming Interfaces (APIs) to a test scheduling engine.

In one or more of the various embodiments, a test scheduling engine may be employed to transform the first and second set of raw metric data into a first and a second set of reduced metric data. In one or more of the various embodiments, the second set of raw metric data may be associated with an API that may be separate from the APIs associated with the first set of raw metric data. In one or more of the various embodiments, providing the first and second set of raw metric data may include providing one or more of latency, availability, outliers, clusters of outliers, or the like.

In one or more of the various embodiments, a quality score engine may be employed to perform further actions, described below.

In one or more of the various embodiments, one or more ordinal ranks may be aggregated for each of the one or more APIs based on the first set of reduced metric data, such that each of the one or more ordinal rankings may be associated with one or more characteristics of the first set and second set of reduced metric data.

In one or more of the various embodiments, each of the one or more APIs may be ranked based on their aggregations of the ordinal ranks.

In one or more of the various embodiments, a quality score may be provided based on a mapping of the ranked APIs to a first distribution model. In one or more of the various embodiments, the distribution model may be arranged to include a skewed Gaussian distribution model.

In one or more of the various embodiments, a second quality score may be generated based on the mapping and the second set of reduced metric data. In one or more of the various embodiments, generating the second quality score, may further include interpolating an array of quality scores for the second set of reduced metric data based on the vector of weights using a linear regression model; and retrieving the second quality score from the array of quality scores for a given API or a given time period.

In one or more of the various embodiments, one or more of the test agent engines may be employed to invoke the one or more APIs that are hosted remote from the one or more test agent engines.

In one or more of the various embodiments, the one or more test engines may employ the one or more APIs to perform actions, including: executing a workflow that may include a sequence of API invocations; providing one or more return values for each API invocation; and employing the one or more return values as one or more parameters in a subsequent API invocation as defined in the workflow.

In one or more of the various embodiments, an outlier detection engine may be employed to perform actions, including: identifying, for a type of metric, one or more modalities; fitting one or more second distribution models to each of the one or more modalities; identifying the one or more outliers from the one or more modalities based on a defined deviation threshold of the one or more second distribution models that are associated with the one or more modalities; assigning the one or more outliers to one or more initial clusters; and iteratively identifying the one or more outliers and assigning the identified outliers to the one or more clusters until a convergence is detected.

Illustrated Operating Environment

FIG. 1 shows components of one embodiment of an environment in which the invention may be practiced. Not all the components may be required to practice various embodiments, and variations in the arrangement and type of the components may be made. As shown, system 100 of FIG. 1 includes local area networks ("LANs")/wide area networks ("WANs")-(network) 111, wireless network 110, client computers 101-104, test subject server computer 112, scheduler server computer 114, and agent server computer 116.

Generally, client computers 102-104 may include virtually any portable computing device capable of receiving and sending a message over a network, such as network 111, wireless network 110, or the like. Client computers 102-104 may also be described generally as client computers that are configured to be portable. Thus, client computers 102-104 may include virtually any portable computing device capable of connecting to another computing device and receiving information. Such devices include portable devices such as, cellular telephones, smart phones, display pagers, radio frequency (RF) devices, infrared (IR) devices, Personal Digital Assistants (PDA's), handheld computers, laptop computers, wearable computers, tablet computers, integrated devices combining one or more of the preceding devices, or the like. As such, client computers 102-104 typically range widely in terms of capabilities and features. For example, a cell phone may have a numeric keypad and a few lines of monochrome Liquid Crystal Display (LCD) on which only text may be displayed. In another example, a web-enabled mobile device may have a touch sensitive screen, a stylus, and several lines of color LCD in which both text and graphics may be displayed.

Client computer 101 may include virtually any computing device capable of communicating over a network to send and receive information, including messaging, performing various online actions, or the like. The set of such devices may include devices that typically connect using a wired or wireless communications medium such as personal computers, multiprocessor systems, microprocessor-based or programmable consumer electronics, network Personal Computers (PCs), or the like. In one embodiment, at least some of client computers 102-104 may operate over wired and/or wireless network. Today, many of these devices include a capability to access and/or otherwise communicate over a network such as network 111 and/or even wireless network 110. Moreover, client computers 102-104 may access various computing applications, including a browser, or other web-based application.

In one embodiment, one or more of client computers 101-104 may be configured to operate within a business or other entity to perform a variety of services for the business or other entity. For example, client computers 101-104 may be configured to operate as a web server, an accounting server, a production server, an inventory server, or the like. However, client computers 101-104 are not constrained to these services and may also be employed, for example, as an end-user computing node, in other embodiments. Further, it should be recognized that more or less client computers may be included within a system such as described herein, and embodiments are therefore not constrained by the number or type of client computers employed.

A web-enabled client computer may include a browser application that is configured to receive and to send web pages, web-based messages, or the like. The browser application may be configured to receive and display graphics, text, multimedia, or the like, employing virtually any web-based language, including a wireless application protocol messages (WAP), or the like. In one embodiment, the browser application is enabled to employ Handheld Device Markup Language (HDML), Wireless Markup Language (WML), WMLScript, JavaScript, Standard Generalized Markup Language (SGML), HyperText Markup Language (HTML), eXtensible Markup Language (XML), HTML5, or the like, to display and send a message. In one embodiment, a user of the client computer may employ the browser application to perform various actions over a network.

Client computers 101-104 also may include one or more client applications that are configured to setup API tests. Client applications may include a capability of managing, operating, or configuring the scheduler server computer 116.

Wireless network 110 is configured to couple client computers 102-104 and its components with network 111. Wireless network 110 may include any of a variety of wireless sub-networks that may further overlay stand-alone ad-hoc networks, or the like, to provide an infrastructure-oriented connection for client computers 102-104. Such sub-networks may include mesh networks, Wireless LAN (WLAN) networks, cellular networks, or the like.

Wireless network 110 may further include an autonomous system of terminals, gateways, routers, or the like connected by wireless radio links, or the like. These connectors may be configured to move freely and randomly and organize themselves arbitrarily, such that the topology of wireless network 110 may change rapidly.

Wireless network 110 may further employ a plurality of access technologies including 2nd (2G), 3rd (3G), 4th (4G), 5th (5G) generation radio access for cellular systems, WLAN, Wireless Router (WR) mesh, or the like. Access technologies such as 2G, 3G, 4G, and future access networks may enable wide area coverage for mobile devices, such as client computers 102-104 with various degrees of mobility. For example, wireless network 110 may enable a radio connection through a radio network access such as Global System for Mobil communication (GSM), General Packet Radio Services (GPRS), Enhanced Data GSM Environment (EDGE), Wideband Code Division Multiple Access (WCDMA), or the like. In essence, wireless network 110 may include virtually any wireless communication mechanism by which information may travel between client computers 102-104, another computing device, network, or the like.

Network 111 is configured to couple network devices with other computing devices, including, test subject server computer 112, scheduler server computer 114, and agent server computer 116, client computer(s) 101, and through wireless network 110 to client computers 102-104. Network 111 is enabled to employ any form of computer readable media for communicating information from one electronic device to another. Also, network 111 can include the Internet in addition to local area networks (LANs), wide area networks (WANs), direct connections, such as through a universal serial bus (USB) port, other forms of computer-readable media, or any combination thereof. On an interconnected set of LANs, including those based on differing architectures and protocols, a router acts as a link between LANs, enabling messages to be sent from one to another. In addition, communication links within LANs typically include twisted wire pair or coaxial cable, while communication links between networks may utilize analog telephone lines, full or fractional dedicated digital lines including T1, T2, T3, and T4, Integrated Services Digital Networks (ISDNs), Digital Subscriber Lines (DSLs), wireless links including satellite links, or other communications links known to those skilled in the art. For example, various Internet Protocols (IP), Open Systems Interconnection (OSI) architectures, and/or other communication protocols, architectures, models, and/or standards, may also be employed within network 111 and wireless network 110. Furthermore, remote computers and other related electronic devices could be remotely connected to either LANs or WANs via a modem and temporary telephone link. In essence, network 111 includes any communication method by which information may travel between computing devices.

Additionally, communication media typically embodies computer-readable instructions, data structures, program modules, or other transport mechanism and includes any information delivery media. By way of example, communication media includes wired media such as twisted pair, coaxial cable, fiber optics, wave guides, and other wired media and wireless media such as acoustic, RF, infrared, and other wireless media. Such communication media is distinct from, however, computer-readable devices described in more detail below.

Figure 3:
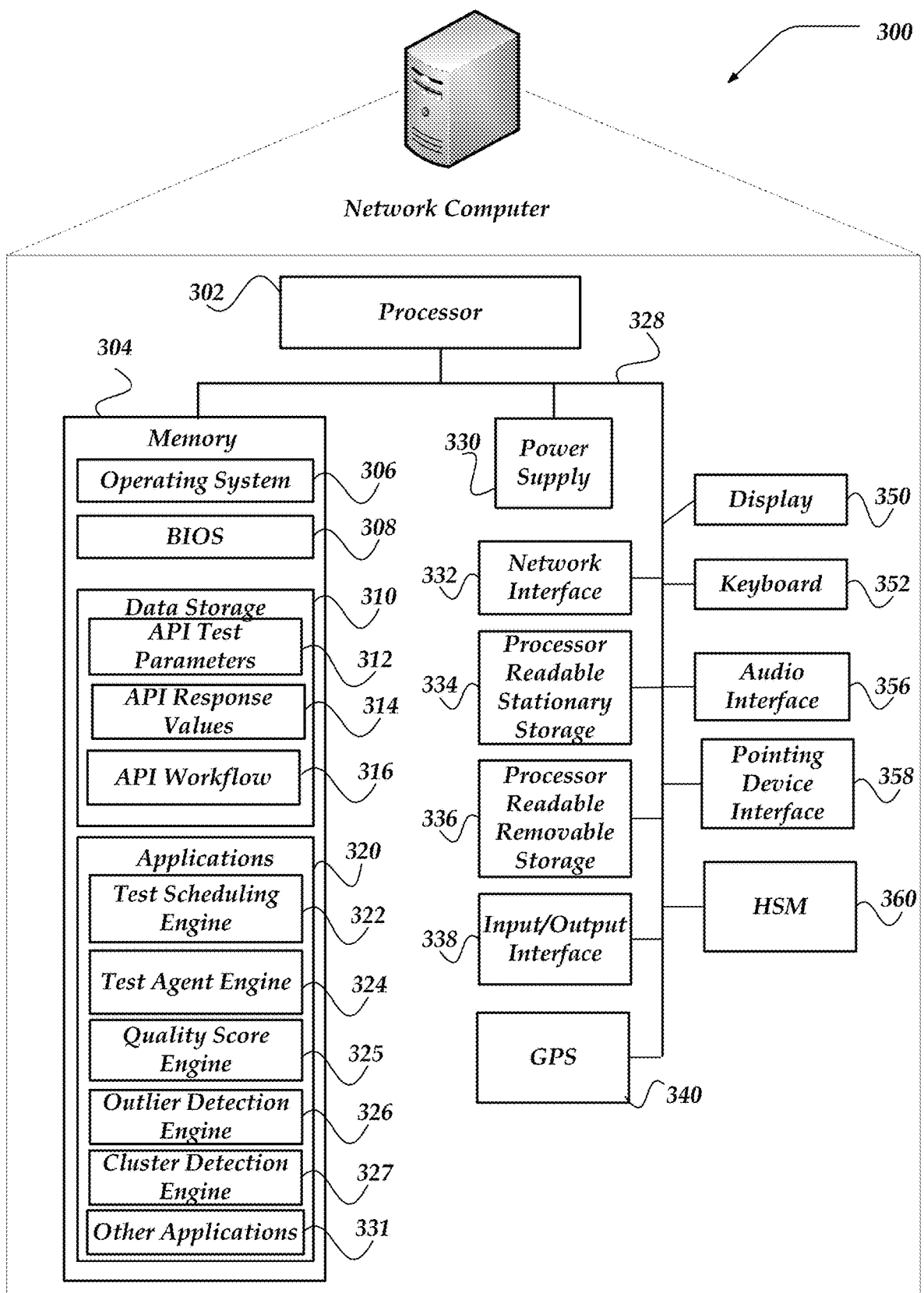
FIG. 3 shows one embodiment of a network computer, in accordance with at least one of the various embodiments.

Test subject server computer 112 may include virtually any network computer that exposes an API capable of being tested, such as network computer 300 of FIG. 3. In one embodiment, test subject server computer 112 may employs various interfaces for providing APIs, including RESTful APIs, SOAP APIs, or any other remoting technology. Test subject server computer 112 may execute APIs using any known method of computation, including the execution of code natively in CPU bytecode or in a runtime environment such as Node.js®, the Java® virtual machine, or the like. Exposed APIs may execute synchronously or asynchronously. APIs may be exposed over a secure channel, such as Transport Layer Security (TLS). Test subject server computer 112 may execute in a cloud computing environment, such as Amazon® Web Services (AWS) or the Google Cloud Platform, as part of a server farm, or as a stand-alone computer.

Scheduler server computer 114 may include virtually any network computer usable to schedule, request, and process the results of test API calls, such as network computer 300 of FIG. 3. In one or more of the various embodiments, scheduler server computer 114 automatically deploys distributed agents to commercial cloud computing providers, including multiple regions and/or zones of a given commercial cloud computing provider, for the purpose of making API test calls from the distributed agents in order to allow a comprehensive and accurate view of the performance and quality of an API from the end user perspective. In one or more of the various embodiments, scheduler server computer 114 requests execution of a test API call. In one or more of the various embodiments, scheduler server computer 114 requests a test API call by posting a message to a queue listened to by one or more of agent server computers 116. The message may use any encoding, such as, for example, JavaScript Object Notation (JSON) or eXensible Markup Language (XML), HTML, plain text (e.g. ASCII or Unicode without predefined control tags), or some other structured, semi-structured, or unstructured format, including binary. The message may include various elements such as parameters, a response ID, HTTP headers, HTTP body, etc. Scheduler server computer 114 may also receive, aggregate, process, and/or store test API responses from agent server computer 116.

In one or more of the various embodiments, scheduler server computer 114 performs a novel method for comparative API quality monitoring using a single blended quality metric calculated from parameters obtained by benchmarking against historical dataset of API call records. In one or more of the various embodiments, scheduler server computer 114 receives raw data metrics from agent server computer 116, and interpolates using a vector of weights to determine a quality score. In one or more of the various embodiments, the vector of weights is generated based on records in the historical dataset of API call records, and in particular based on records of previous calls to the API and/or records of previous calls to other APIs that had the same or similar metrics recorded.

Agent server computer 116 may include virtually any network computer usable to invoke APIs, such as network computer 300 of FIG. 3. In one embodiment, agent server computer 116 may employs various techniques for receiving a request to test an API call, such as listening to a message queue. Upon receipt of an API test request message, agent server computer may invoke the target web API, recording statistics such as latency, throughput, etc. In one or more of the various embodiments, upon receiving a response from the web API, agent server computer 116 transmits the recorded statistics and the response to the scheduler server computer 114 that initiated the request.

Although FIG. 1 illustrates test subject computer 112, scheduler server computer 114, and agent server computer 116 as single computers, the innovations and/or embodiments are not so limited. For example, one or more functions of computers 112, 114, and/or 116 may be distributed across one or more distinct network computers. Moreover, computers 112, 114, and/or 116 are not limited to a particular configuration such as the one shown in FIG. 1. Thus, in one embodiment, computers 112, 114, and/or 116 may be implemented using a plurality of network computers. In other embodiments, server computers may be implemented using a plurality of network computers in a cluster architecture, a peer-to-peer architecture, or the like. Further, in at least one of the various embodiments, computers 112, 114, and/or 116 may be implemented using one or more cloud instances in one or more cloud networks. Accordingly, these innovations and embodiments are not to be construed as being limited to a single environment, and other configurations, and architectures are also envisaged.

Illustrative Client Computer

Figure 2:
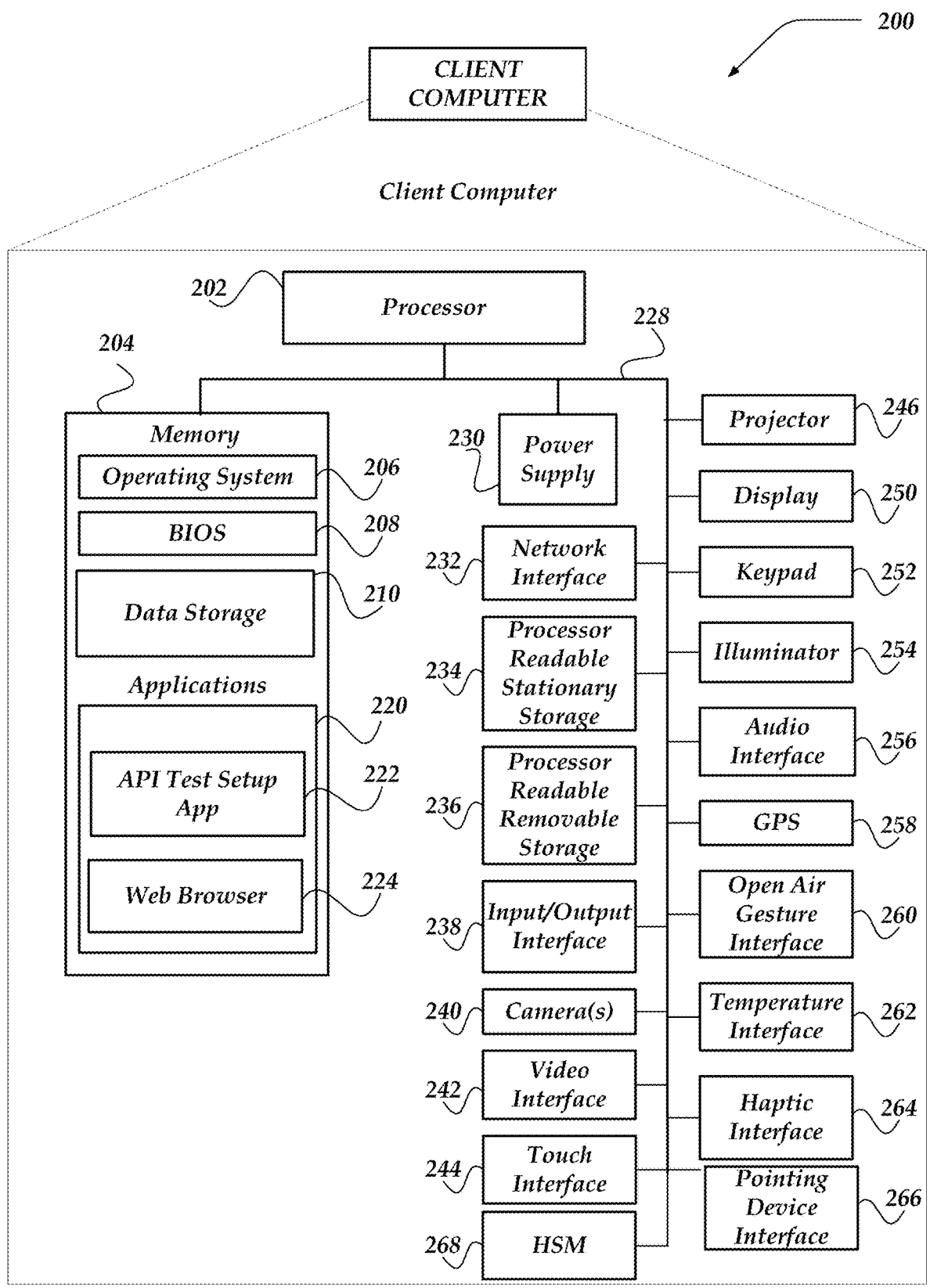
FIG. 2 shows one embodiment of a client computer that may be included in a system in accordance with at least one of the various embodiments.

FIG. 2 shows one embodiment of client computer 200 that may include many more or less components than those shown. Client computer 200 may represent, for example, at least one embodiment of mobile computers or client computers shown in FIG. 1.

Client computer 200 may include one or more processors, such as, processor 202 in communication with memory 204 via bus 228. Client computer 200 may also include power supply 230, network interface 232, audio interface 256, display 250, keypad 252, illuminator 254, video interface 242, input/output interface 238, haptic interface 264, global positioning systems (GPS) receiver 258, open air gesture interface 260, temperature interface 262, camera(s) 240, projector 246, pointing device interface 266, processor-readable stationary storage device 234, and processor-readable removable storage device 236. Client computer 200 may optionally communicate with a base station (not shown), or directly with another computer. And in one embodiment, although not shown, a gyroscope may be employed within client computer 200 to measuring and/or maintaining an orientation of client computer 200.

Power supply 230 may provide power to client computer 200. A rechargeable or non-rechargeable battery may be used to provide power. The power may also be provided by an external power source, such as an AC adapter or a powered docking cradle that supplements and/or recharges the battery.

Network interface 232 includes circuitry for coupling client computer 200 to one or more networks, and is constructed for use with one or more communication protocols and technologies including, but not limited to, protocols and technologies that implement any portion of the OSI model for mobile communication (GSM), CDMA, time division multiple access (TDMA), UDP, TCP/IP, SMS, MMS, GPRS, WAP, UWB, WiMax, SIP/RTP, GPRS, EDGE, WCDMA, LTE, UMTS, OFDM, CDMA2000, EV-DO, HSDPA, or any of a variety of other wireless communication protocols. Network interface 232 is sometimes known as a transceiver, transceiving device, or network interface card (MC).

Audio interface 256 may be arranged to produce and receive audio signals such as the sound of a human voice. For example, audio interface 256 may be coupled to a speaker and microphone (not shown) to enable telecommunication with others and/or generate an audio acknowledgement for some action. A microphone in audio interface 256 can also be used for input to or control of client computer 200, e.g., using voice recognition, detecting touch based on sound, and the like.

Display 250 may be a liquid crystal display (LCD), gas plasma, electronic ink, light emitting diode (LED), Organic LED (OLED) or any other type of light reflective or light transmissive display that can be used with a computer. Display 250 may also include a touch interface 244 arranged to receive input from an object such as a stylus or a digit from a human hand, and may use resistive, capacitive, surface acoustic wave (SAW), infrared, radar, or other technologies to sense touch and/or gestures.

Projector 246 may be a remote handheld projector or an integrated projector that is capable of projecting an image on a remote wall or any other reflective object such as a remote screen.

Video interface 242 may be arranged to capture video images, such as a still photo, a video segment, an infrared video, or the like. For example, video interface 242 may be coupled to a digital video camera, a web-camera, or the like. Video interface 242 may comprise a lens, an image sensor, and other electronics. Image sensors may include a complementary metal-oxide-semiconductor (CMOS) integrated circuit, charge-coupled device (CCD), or any other integrated circuit for sensing light.

Keypad 252 may comprise any input device arranged to receive input from a user. For example, keypad 252 may include a push button numeric dial, or a keyboard. Keypad 252 may also include command buttons that are associated with selecting and sending images.

Illuminator 254 may provide a status indication and/or provide light. Illuminator 254 may remain active for specific periods of time or in response to event messages. For example, when illuminator 254 is active, it may backlight the buttons on keypad 252 and stay on while the client computer is powered. Also, illuminator 254 may backlight these buttons in various patterns when particular actions are performed, such as dialing another client computer. Illuminator 254 may also cause light sources positioned within a transparent or translucent case of the client computer to illuminate in response to actions.

Further, client computer 200 may also comprise hardware security module (HSM) 268 for providing additional tamper resistant safeguards for generating, storing and/or using security/cryptographic information such as, keys, digital certificates, passwords, passphrases, two-factor authentication information, or the like. In some embodiments, hardware security module may be employed to support one or more standard public key infrastructures (PKI), and may be employed to generate, manage, and/or store keys pairs, or the like. In some embodiments, HSM 268 may be a stand-alone computer, in other cases, HSM 268 may be arranged as a hardware card that may be added to a client computer.

Client computer 200 may also comprise input/output interface 238 for communicating with external peripheral devices or other computers such as other client computers and network computers. The peripheral devices may include an audio headset, display screen glasses, remote speaker system, remote speaker and microphone system, and the like. Input/output interface 238 can utilize one or more technologies, such as Universal Serial Bus (USB), Infrared, WiFi, WiMax, Bluetooth™, and the like.

Input/output interface 238 may also include one or more sensors for determining geolocation information (e.g., GPS), monitoring electrical power conditions (e.g., voltage sensors, current sensors, frequency sensors, and so on), monitoring weather (e.g., thermostats, barometers, anemometers, humidity detectors, precipitation scales, or the like), or the like. Sensors may be one or more hardware sensors that collect and/or measure data that is external to client computer 200.

Haptic interface 264 may be arranged to provide tactile feedback to a user of the client computer. For example, the haptic interface 264 may be employed to vibrate client computer 200 in a particular way when another user of a computer is calling. Temperature interface 262 may be used to provide a temperature measurement input and/or a temperature changing output to a user of client computer 200. Open air gesture interface 260 may sense physical gestures of a user of client computer 200, for example, by using single or stereo video cameras, radar, a gyroscopic sensor inside a computer held or worn by the user, or the like. Camera 240 may be used to track physical eye movements of a user of client computer 200.

GPS transceiver 258 can determine the physical coordinates of client computer 200 on the surface of the Earth, which typically outputs a location as latitude and longitude values. GPS transceiver 258 can also employ other geo-positioning mechanisms, including, but not limited to, triangulation, assisted GPS (AGPS), Enhanced Observed Time Difference (E-OTD), Cell Identifier (CI), Service Area Identifier (SAI), Enhanced Timing Advance (ETA), Base Station Subsystem (BSS), or the like, to further determine the physical location of client computer 200 on the surface of the Earth. It is understood that under different conditions, GPS transceiver 258 can determine a physical location for client computer 200. In at least one embodiment, however, client computer 200 may, through other components, provide other information that may be employed to determine a physical location of the client computer, including for example, a Media Access Control (MAC) address, IP address, and the like.

Human interface components can be peripheral devices that are physically separate from client computer 200, allowing for remote input and/or output to client computer 200. For example, information routed as described here through human interface components such as display 250 or keypad 252 can instead be routed through network interface 232 to appropriate human interface components located remotely. Examples of human interface peripheral components that may be remote include, but are not limited to, audio devices, pointing devices, keypads, displays, cameras, projectors, and the like. These peripheral components may communicate over a Pico Network such as Bluetooth™, Zigbee™ and the like. One non-limiting example of a client computer with such peripheral human interface components is a wearable computer, which might include a remote pico projector along with one or more cameras that remotely communicate with a separately located client computer to sense a user's gestures toward portions of an image projected by the pico projector onto a reflected surface such as a wall or the user's hand.

Memory 204 may include RAM, ROM, and/or other types of memory. Memory 204 illustrates an example of computer-readable storage media (devices) for storage of information such as computer-readable instructions, data structures, program modules or other data. Memory 204 may store BIOS 208 for controlling low-level operation of client computer 200. The memory may also store operating system 206 for controlling the operation of client computer 200. It will be appreciated that this component may include a general-purpose operating system such as a version of UNIX, or LINUX™ or a specialized client computer communication operating system such as Windows Phone™, or the Symbian® operating system. The operating system may include, or interface with a Java virtual machine module that enables control of hardware components and/or operating system operations via Java application programs.

Memory 204 may further include one or more data storage 210, which can be utilized by client computer 200 to store, among other things, applications 220 and/or other data. For example, data storage 210 may also be employed to store information that describes various capabilities of client computer 200. The information may then be provided to another device or computer based on any of a variety of methods, including being sent as part of a header during a communication, sent upon request, or the like. Data storage 210 may also be employed to store social networking information including address books, buddy lists, aliases, user profile information, or the like. Data storage 210 may further include program code, data, algorithms, and the like, for use by a processor, such as processor 202 to execute and perform actions. In one embodiment, at least some of data storage 210 might also be stored on another component of client computer 200, including, but not limited to, non-transitory processor-readable removable storage device 236, processor-readable stationary storage device 234, or even external to the client computer.

Applications 220 may include computer executable instructions which, when executed by client computer 200, transmit, receive, and/or otherwise process instructions and data. Applications 220 may include, for example, API test setup app 222. In at least one of the various embodiments, API test setup app 222 may be used to add, modify, delete, and schedule API tests. API test setup app 222 may enable end users to test an API at a certain time of day and/or day of the week. API test setup app 222 may enable end users to determine where agent server computer 116 is located, thereby determining what region the invocation should originate from. In one or more of the various embodiments, API test setup app 222 may enable end users to determine what regions, zones, or other geographical groupings of test subject server computers 112. In this way, an end user is enabled to test any combination of geographic source and destination of an API test invocation.

Additionally or alternatively, API test setup app 222 may enable an end user to select a type of computing resource (e.g. a lower, middle, or higher performance tier cloud computing resource) on which to invoke the API test. In this way, an end user is enabled to monitor and experiment with virtually any combination of geographic and performance tier of cloud computing resource.

Applications 220 may also include web browser application 224 that is configured to receive and to send web pages, web-based messages, graphics, text, multimedia, and the like. The client computer's browser application may employ virtually any programming language, including a wireless application protocol messages (WAP), and the like. In at least one embodiment, the browser application is enabled to employ Handheld Device Markup Language (HDML), Wireless Markup Language (WML), WMLScript, JavaScript, Standard Generalized Markup Language (SGML), HyperText Markup Language (HTML), eXtensible Markup Language (XML), HTML5, and the like. In one embodiment, an end user may use web browser application 224 to interact with an API test setup website to perform operations similar to the operations described above with regard to API test setup app 222.

Web browser application 224 may navigate to a technical web-based software subsystem for testing and monitoring web APIs. A user with the proper authorization can create an account from which it is possible to access the web-based software subsystem. The web-based software subsystem provides a number of wizards (structured software walkthroughs that guide users in setting tasks within the subsystem) that allows users to undertake a number of tasks related to monitoring APIs. These tasks include Creating authentications/tokens with which to access an API.
    Creating API test calls, including parameters, expected return values.
    Creating workflows—combined tests that use parameters extracted from the results of one API test call as input for next call.
    Creating conditions for user-defined results to API tests depending on API test call characteristics and content.
    Creating alerts depending on API test call characteristics
    Creating webhooks, i.e. standardized connection type to certain third party management services, depending on API test call characteristics. The third party management service may, for example, initialize additional processing capacity in response to a detected cluster of poorly performing web APIs.
    Deploying and scheduling API test calls and workflows to cloud services in various geographies.
    Examining results of test call and workflows.
    Examining statistical analysis of historical API test call data.

In particular, the fundamental purpose of the subsystem is to allow to users to set up test calls that exercise particular internal and external APIs in order to be able to determine how the API performs over time and whether the performance over time meets the needs of API stakeholders. The test calls are made by software agents typically residing in the different commercial cloud service locations. Thus the software service for users can be an entirely virtual one. It is not necessary for any software to be hosted on the computers owned or directly controlled by the organization. However, it is also possible for organizations to run the agent software on hardware from physical or virtual hardware within an organization's internal computer network if this better reflects the operational usage of the APIs under study and the needs of the organization.

Other examples of application programs include calendars, search programs, email client applications, IM applications, SMS applications, Voice Over Internet Protocol (VOIP) applications, contact managers, task managers, transcoders, database programs, word processing programs, security applications, spreadsheet programs, games, search programs, and so forth.

Additionally, in one or more embodiments (not shown in the figures), client computer 200 may include an embedded logic hardware device instead of a CPU, such as, an Application Specific Integrated Circuit (ASIC), Field Programmable Gate Array (FPGA), Programmable Array Logic (PAL), or the like, or combination thereof. The embedded logic hardware device may directly execute its embedded logic to perform actions. Also, in one or more embodiments (not shown in the figures), client computer 200 may include a hardware microcontroller instead of a CPU. In at least one embodiment, the microcontroller may directly execute its own embedded logic to perform actions and access its own internal memory and its own external Input and Output Interfaces (e.g., hardware pins and/or wireless transceivers) to perform actions, such as System On a Chip (SOC), or the like.

Illustrative Network Computer

FIG. 3 shows one embodiment of network computer 300 that may be included in a system implementing at least one of the various embodiments. Network computer 300 may include many more or less components than those shown in FIG. 3. However, the components shown are sufficient to disclose an illustrative embodiment for practicing these innovations. Network computer 300 may represent, for example, one embodiment of at least one of agent server computer 116, scheduler server computer 114, test subject server computer 112 of FIG. 1.

As shown in the figure, network computer 300 includes one or more processors, such as processor 302 in communication with a memory 304 via a bus 328. Network computer 300 also includes a power supply 330, network interface 332, audio interface 356, display 350, keyboard 352, input/output interface 338, processor-readable stationary storage device 334, and processor-readable removable storage device 336. Power supply 330 provides power to network computer 300.

Network interface 332 includes circuitry for coupling network computer 300 to one or more networks, and is constructed for use with one or more communication protocols and technologies including, but not limited to, protocols and technologies that implement any portion of the Open Systems Interconnection model (OSI model), global system for mobile communication (GSM), code division multiple access (CDMA), time division multiple access (TDMA), user datagram protocol (UDP), transmission control protocol/Internet protocol (TCP/IP), Short Message Service (SMS), Multimedia Messaging Service (MMS), general packet radio service (GPRS), WAP, ultra wide band (UWB), IEEE 802.16 Worldwide Interoperability for Microwave Access (WiMax), Session Initiation Protocol/Real-time Transport Protocol (SIP/RTP), or any of a variety of other wired and wireless communication protocols. Network interface 332 is sometimes known as a transceiver, transceiving device, or network interface card (NIC). Network computer 300 may optionally communicate with a base station (not shown), or directly with another computer.

Audio interface 356 is arranged to produce and receive audio signals such as the sound of a human voice. For example, audio interface 356 may be coupled to a speaker and microphone (not shown) to enable telecommunication with others and/or generate an audio acknowledgement for some action. A microphone in audio interface 356 can also be used for input to or control of network computer 300, for example, using voice recognition.

Display 350 may be a liquid crystal display (LCD), gas plasma, electronic ink, light emitting diode (LED), Organic LED (OLED) or any other type of light reflective or light transmissive display that can be used with a computer. Display 350 may be a handheld projector or pico projector capable of projecting an image on a wall or other object.

Network computer 300 may also comprise input/output interface 338 for communicating with external devices or computers not shown in FIG. 3. Input/output interface 338 can utilize one or more wired or wireless communication technologies, such as USB™, Firewire™, WiFi, WiMax, Thunderbolt™, Infrared, Bluetooth™, Zigbee™, serial port, parallel port, and the like.

Also, input/output interface 338 may also include one or more sensors for determining geolocation information (e.g., GPS), monitoring electrical power conditions (e.g., voltage sensors, current sensors, frequency sensors, and so on), monitoring weather (e.g., thermostats, barometers, anemometers, humidity detectors, precipitation scales, or the like), or the like. Sensors may be one or more hardware sensors that collect and/or measure data that is external to network computer 300. Human interface components can be physically separate from network computer 300, allowing for remote input and/or output to network computer 300. For example, information routed as described here through human interface components such as display 350 or keyboard 352 can instead be routed through the network interface 332 to appropriate human interface components located elsewhere on the network. Human interface components include any component that allows the computer to take input from, or send output to, a human user of a computer. Accordingly, pointing devices such as mice, styluses, track balls, or the like, may communicate through pointing device interface 358 to receive user input.

GPS transceiver 340 can determine the physical coordinates of network computer 300 on the surface of the Earth, which typically outputs a location as latitude and longitude values. GPS transceiver 340 can also employ other geo-positioning mechanisms, including, but not limited to, triangulation, assisted GPS (AGPS), Enhanced Observed Time Difference (E-OTD), Cell Identifier (CI), Service Area Identifier (SAI), Enhanced Timing Advance (ETA), Base Station Subsystem (BSS), or the like, to further determine the physical location of network computer 300 on the surface of the Earth. It is understood that under different conditions, GPS transceiver 340 can determine a physical location for network computer 300. In at least one embodiment, however, network computer 300 may, through other components, provide other information that may be employed to determine a physical location of the client computer, including for example, a Media Access Control (MAC) address, IP address, and the like.

Memory 304 may include Random Access Memory (RAM), Read-Only Memory (ROM), and/or other types of memory. Memory 304 illustrates an example of computer-readable storage media (devices) for storage of information such as computer-readable instructions, data structures, program modules or other data. Memory 304 stores a basic input/output system (BIOS) 308 for controlling low-level operation of network computer 300. The memory also stores an operating system 306 for controlling the operation of network computer 300. It will be appreciated that this component may include a general-purpose operating system such as a version of UNIX, or LINUX™, or a specialized operating system such as Microsoft Corporation's Windows® operating system, or the Apple Corporation's IOS® operating system. The operating system may include, or interface with a Java virtual machine module that enables control of hardware components and/or operating system operations via Java application programs. Likewise, other runtime environments may be included.

Memory 304 may further include one or more data storage 310, which can be utilized by network computer 300 to store, among other things, applications 320 and/or other data. For example, data storage 310 may also be employed to store information that describes various capabilities of network computer 300. The information may then be provided to another device or computer based on any of a variety of methods, including being sent as part of a header during a communication, sent upon request, or the like. Data storage 310 may also be employed to store social networking information including address books, buddy lists, aliases, user profile information, or the like. Data storage 310 may further include program code, instructions, data, algorithms, and the like, for use by a processor, such as processor 302 to execute and perform actions such as those actions described below. In one embodiment, at least some of data storage 310 might also be stored on another component of network computer 300, including, but not limited to, non-transitory media inside processor-readable removable storage device 336, processor-readable stationary storage device 334, or any other computer-readable storage device within network computer 300, or even external to network computer 300. Data storage 310 may include, for example, API test parameters 312, API response values 314, API workflow 316, or the like.

Applications 320 may include computer executable instructions which, when executed by network computer 300, transmit, receive, and/or otherwise process messages (e.g., SMS, Multimedia Messaging Service (MIMS), Instant Message (IM), email, and/or other messages), audio, video, and enable telecommunication with another user of another mobile computer. Other examples of application programs include calendars, search programs, email client applications, IM applications, SMS applications, Voice Over Internet Protocol (VOIP) applications, contact managers, task managers, transcoders, database programs, word processing programs, security applications, spreadsheet programs, games, search programs, and so forth. Applications 320 may include test scheduling engine 322, test agent engine 324, quality score engine 325, outlier detection engine 326, cluster detection engine 327, or other applications 331 that perform actions further described below. In at least one of the various embodiments, one or more of the applications may be implemented as modules and/or components of another engine. Further, in at least one of the various embodiments, engines may be implemented as operating system extensions, modules, plugins, or the like.

One embodiment of test scheduling engine 322 is described in more detail below in conjunction with FIG. 6. Briefly, however, test scheduling engine 322, as implemented by scheduler server computer 114, processes API test requests. For example, test scheduling engine 322 processes API test requests received from an end user, and coordinates when, and from what geographic region, to transmit a request to monitor an API.

Most APIs exposed by API providers are classified as RESTful APIs that satisfy all or most of the requirements of Representational state transfer (REST) or RESTful web services to support interoperability between systems on computer networks. (See Fielding, R. T., 2000, *Architectural Styles and the Design of Network-based Software Architectures*, PhD dissertation, University of California, Irvine.) Some organizations provide legacy APIs based on the SOAP (Simple Object Access Protocol) standard. The use of SOAP APIs is generally a legacy of components of the business operations ecosystem developed before the introduction of RESTful APIs.

Examples of API usage include returning a weather report for a particular location, the price of a particular stock, the status of a particular social network user or the availability of a particular hotel room when a properly authorized and permitted API call is made by the requesting subsystem to a serving subsystem.

The returned information may be used by test scheduling engine 322 to solve a technological or scientific problem, such as coordinating an Internet of Things (IoT) installation of sensors to control a heating or air conditioning system, managing a dynamic allotment of server computing power, or a computerized analysis of stock prices. The returned information may also be used as part of some business operation or process. On the basis of the returned information and the processing of the information, further API calls might be made to the same API or other APIs.

For security and operational reasons, an organization might wish to restrict access to the APIs exposed by serving subsystems it manages. A standardized authorization scheme, such as OAuth2, is normally used by the API provider to manage unauthorized access to an API. API providers may also restrict the number of calls that an end user can make to an API in a given time period to prevent the API from becoming overloaded or may charge the end user for using the API. OAuth2 uses a Client ID and Client Secret, provided by the organization that manages a particular API, to generate an access token. The token is sent with the HTTP request by the requesting subsystem to the serving subsystem that supports the API. When the token is created, the serving subsystem token can be set to expire after a certain time after which it will be necessary to generate a new token. Proper management of API access, authentication and authorization is an essential and major activity of overall API management.

One embodiment of test agent engine 324 is described in more detail below in conjunction with FIG. 4. Briefly, however, test agent engine 324, as implemented by an agent server computer 116, responds to API invocation requests, e.g. API invocation requests received from a test scheduling engine 322 of a scheduler server computer 114. In one embodiment, test agent engine 324 responds to API monitor requests by invoking a web API, measuring attributes of the invoked web API, recording the return value of the invoked web API, and forwarding the attributes and return value to the scheduler server computer 114 that sent the request.

One embodiment of quality score engine 325 is described in more detail below in conjunction with FIG. 9. In one or more of the various embodiments, to better comprehend the varied types and vast amount of data collected during the invocation of web APIs, a blended quality score, also considered a consistency score, is generated by quality score engine 325.

Many organizations have functions that rely on the timely provision of mission-critical data and information via APIs to internal subsystems and the subsystems of partner organizations or external users. API users, providers and stakeholders have explicit and implicit expectations about the performance of the APIs they use and manage. If an API is not operating as expected, organizations can be exposed to potentially severe impacts on operations, degradation of system efficiency, loss of revenue and unnecessary incurring of costs. It is thus important to users, providers and stakeholders of APIs that the overall quality of the API is maintained at an acceptable level.

In some cases, users, providers and stakeholders can define formal Service Level Agreements (SLA) that explicitly state criteria by which it is possible to determine whether an API is meeting its SLA. Depending on the SLA criteria, an API quality monitoring subsystem can use data and information derived from API test calls to determine automatically whether an API is meeting its SLA. Alternatively, the API quality monitoring subsystem can report data and information related to API performance to human users who can apply judgement to determine whether API is meeting its SLA. Furthermore, machine learning techniques can be applied to automate the process of determining whether an API meets qualitative criteria related to business judgement.

Based on the large amount of historical data obtained through the use of the various embodiments, a number of key factors associated with API quality have been identified. These are 1. Availability—the percentage of calls to the API that are successful because the API is operating and returns the expected response given the specific form of the API call.
2. Average latency—the latency is the overall time that the API takes to respond to a call. The mean, median and modal latencies all provide useful information about the behavior of an API. An ideal API will typically have a mean, median and mode that are all close to one another with a distribution that is a good approximation to a normal distribution with a standard deviation that is small compared to the mean latency. In practice, many APIs do not display this ideal behavior. Latency can vary depending on many factors. Intercontinental API calls (calls from a location in a different continent to the one in which the serving subsystem is located) will necessarily have intrinsically longer latencies. If latency is too long, the requesting process might timeout the request. This can lead to the failure of the operation from the end user perspective with the consequence loss of revenue or unnecessary cost to either the end user, the API provider or both.

For most API calls, it is possible to divide the call into 6 consecutive components the durations of which are measured and recorded by embodiments. The latency of a call is the sum of the duration of each of these parts. These parts are DNS (Domain Name Service) lookup.
TCP (Transmission Control Protocol) connect.
HTTPS (Hypertext Transport Protocol Secure) handshake.
Upload time—the time it takes to transmit the headers and body of the HTTP request.
Processing time—the time it takes for the API to perform operations on the input parameters.
Download time—the time it takes for the HTTP response to be received.

As discussed further in the sections below, it is possible to use the average values of the components of the different parts of an API call to obtain information and the behavior of APIs.

3. Outliers—An outlier call is an API call that has a much longer than expected latency. These outlier calls have many different causes and are typically associated with performance issues with the serving subsystem. A high percentage of outliers is indicative of significant issues with the serving system that need to be resolved. Although less common, it is also possible to have short outliers. An unusually short latency might indicate that some back-end processing that normally takes place when a call is made. This might indicate a serious server error that may or may not be associated with an appropriate HTTP response indicating an error (typically a response in the 5xx range). Note that it is possible to analyze the latencies of various components of a call, where these are recorded, and thus identify outliers in different components. In one or more of the various embodiments, a similar analysis can be performed on any metric associated with a test API invocation.
4. Clustering of outliers—Outliers are often observed in close proximity to one another. This is generally indicative of an issue with the serving subsystem that occurs over a particular period of time. A high number of clusters is indicative of significant issues with the serving subsystem that need to be resolved. Note that it is possible to analyze the clusters of outliers of the various components of a call, where these are recorded. This allows a better understanding of the underlying sources of performance issues with an API.

One embodiment of outlier detection engine 326 and cluster detection engine 327 is described in more detail below in conjunction with FIG. 12. Briefly, however, outlier detection engine 326 and cluster detection engine 327 are implemented by scheduler server computer 114. In one or more of the various embodiments, outliers are detected by first identifying modalities associated with previous API test invocations. In one or more of the various embodiments, a skewed Gaussian distributed is fitted to each mode, after which outliers are identified and assigned to clusters. Outliers are iteratively identified and assigned to clusters until outliers converge into one or more clusters. Once clusters are identified, they may be correlated with other events known to happen when the clustered outliers were measured. This correlation may be implemented using web hooks and/or a third party management system. In one or more of the various embodiments, outlier and cluster metrics for an API may themselves be used as a metric to generate confidence scores.

5. Payload content—It is important to ensure that the returned payload has the expected form and content to meet both the technical and operational/business expectations of the requesting subsystem and the end user. For instance, the serving subsystem may return an empty, incomplete or damaged JSON document. To the serving subsystem and from the perspective of the operations center, the request appears to have successfully handled, but to the requesting subsystem and the end user, the call has not been successfully handled.
6. Performance from different cloud services—Requesting subsystems may be hosted by any of a number of commercial or non-commercial cloud service providers. Significant variations in performance can be observed for calls made from different cloud service providers. These variations can cause different end users to perceive a different quality of service and thus the overall effectiveness of the business ecosystem. A high quality API will have behave similarly from all cloud services. Differences in service quality for different cloud services can be difficult to detect from the operations center.
7. Performance from different geographical regions—Requesting subsystems may be hosted by commercial cloud service providers in any of a number of geographical locations. Significant variations in performance can be observed for calls made from different geographical locations, which can cause different end users to perceive a different quality of service and thus the overall effectiveness of the system. A high quality API will behave similarly from all geographical locations, taking into account intrinsic differences between locations (physical distance). Differences in service quality for different geographical locations can be difficult to detect from the operations center.

To maximize the efficiency, organizations monitor the quality of APIs. Since an organization might be critically dependent on many hundreds of APIs and because the overall quality of each API is a function of several contingent and potentially interrelated factors, a mechanism for assisting managers and other stakeholders in identifying APIs that are behaving both at the overall expected quality level and below it solves a technical problem particular to web scale computing. Such a mechanism will allow remedial and continuous improvement activities related to behavior of APIs to be undertaken in an efficient manner to ensure that the APIs used by the organization are managed to optimize their efficiency.

It is possible to derive a number of metrics from historical data of API performance. Some metrics, such as mean latency, are straightforward to derive, or require no derivation at all. Others, such as the number of outliers or the number of clusters of outliers, depend on determining whether an individual test result should be considered to be an outlier and if so whether it is a member of a cluster of outliers. Whether a test result is a member of a cluster of outliers is based on historical data, and is discussed in more detail below in conjunction with FIG. 12.

In one or more of the various embodiments, API calls have the same generic request/response structure, such that, for each API, it is possible to quantify a number of a metrics for a given period such as the business week or calendar month. Each metric provides a degree of insight into the behavior of the API, for instance whether it slow compared to similar APIs and whether it produces an unusual number of outliers. Each of these metrics is a factor in determining the overall quality of the API.

API quality can be considered to be a multidimensional attribute. The number of dimensions is equal to the number of API metrics than can be available. This number is in practice larger than 3 and thus the multidimensional attribute is difficult for human users to visualize, understand, and use to generate actionable intelligence on a real-time basis. By blending the metrics into a single, numerical value, it is possible for stakeholders to determine at a glance the absolute and relative performance and quality of the monitored APIs. With this information, humans are enabled to make timely decisions with respect to the quality of the monitored APIs.

In principle, a raw metric may have an arbitrary form. The value of the metric may or may not have dimensions. For example, mean latency has dimension of units of time (typically milliseconds) and number of outliers per period has units of frequency (typically per week or per month). Other raw metrics, such as the number of cloud services used in a period are dimensionless.

Briefly, quality score engine 325, as implemented by scheduler server computer 114, processes metrics associated with previous web API invocations, generating a vector of weights that can be applied to new web APIs (both new invocations of the same API and new APIs that have one or more metrics in common with the previous web API invocations). In one or more of the various embodiments, the vector of weights is applied to metrics associated with one or more invocations of the new web API, generating a consistency score. In one or more of the various embodiments, a linear regression model is applied to generate the consistency score, although neural nets and other supervised or unsupervised artificial intelligence methods are similarly contemplated.

Furthermore, in at least one of the various embodiments, test scheduling engine 322, test agent engine 324, quality score engine 325, outlier detection engine 326, cluster detection engine 327 or the like, may be operative in a cloud-based computing environment rather than being tied to one or more specific physical network computers. In at least one of the various embodiments, these applications, and others, that comprise the incident management platform may be executing within virtual machines and/or virtual servers that may be managed in a cloud-based based computing environment. In at least one of the various embodiments, in this context the applications may flow from one physical network computer within the cloud-based environment to another depending on performance and scaling considerations automatically managed by the cloud computing environment. Likewise, in at least one of the various embodiments, virtual machines and/or virtual servers dedicated to test scheduling engine 322, test agent engine 324, quality score engine 325, outlier detection engine 326, or cluster detection engine 327 may be provisioned and de-commissioned automatically.

In at least one of the various embodiments, applications, such as, test scheduling engine 322, test agent engine 324, quality score engine 325, outlier detection engine 326, cluster detection engine 327, or the like, may be arranged to employ geo-location information to select one or more localization features, such as, time zones, languages, currencies, calendar formatting, or the like. Localization features may be used in user-interfaces and well as internal processes and/or databases. In at least one of the various embodiments, geo-location information used for selecting localization information may be provided by GPS 340. Also, in some embodiments, geolocation information may include information providing using one or more geolocation protocol over the networks, such as, wireless network 108 and/or network 111.

Further, network computer 300 may also comprise hardware security module (HSM) 360 for providing additional tamper resistant safeguards for generating, storing and/or using security/cryptographic information such as, keys, digital certificates, passwords, passphrases, two-factor authentication information, or the like. In some embodiments, hardware security module may be employ to support one or more standard public key infrastructures (PKI), and may be employed to generate, manage, and/or store keys pairs, or the like. In some embodiments, HSM 360 may be a stand-alone network computer, in other cases, HSM 360 may be arranged as a hardware card that may be installed in a network computer.

Additionally, in one or more embodiments (not shown in the figures), network computer 300 may include one or more embedded logic hardware devices instead of one or more CPUs, such as, Application Specific Integrated Circuits (ASICs), Field Programmable Gate Arrays (FPGAs), Programmable Array Logic (PAL), or the like, or combination thereof. The one or more embedded logic hardware devices may directly execute embedded logic to perform actions. Also, in one or more embodiments (not shown in the figures), the network computer may include one or more hardware microcontrollers instead of one or more CPUs. In at least one embodiment, the microcontrollers may directly execute embedded logic to perform actions and access their own internal memory and their own external Input and Output Interfaces (e.g., hardware pins and/or wireless transceivers) to perform actions, such as System On a Chip (SOC), or the like.

Illustrative Logical System Architecture

Figure 4:
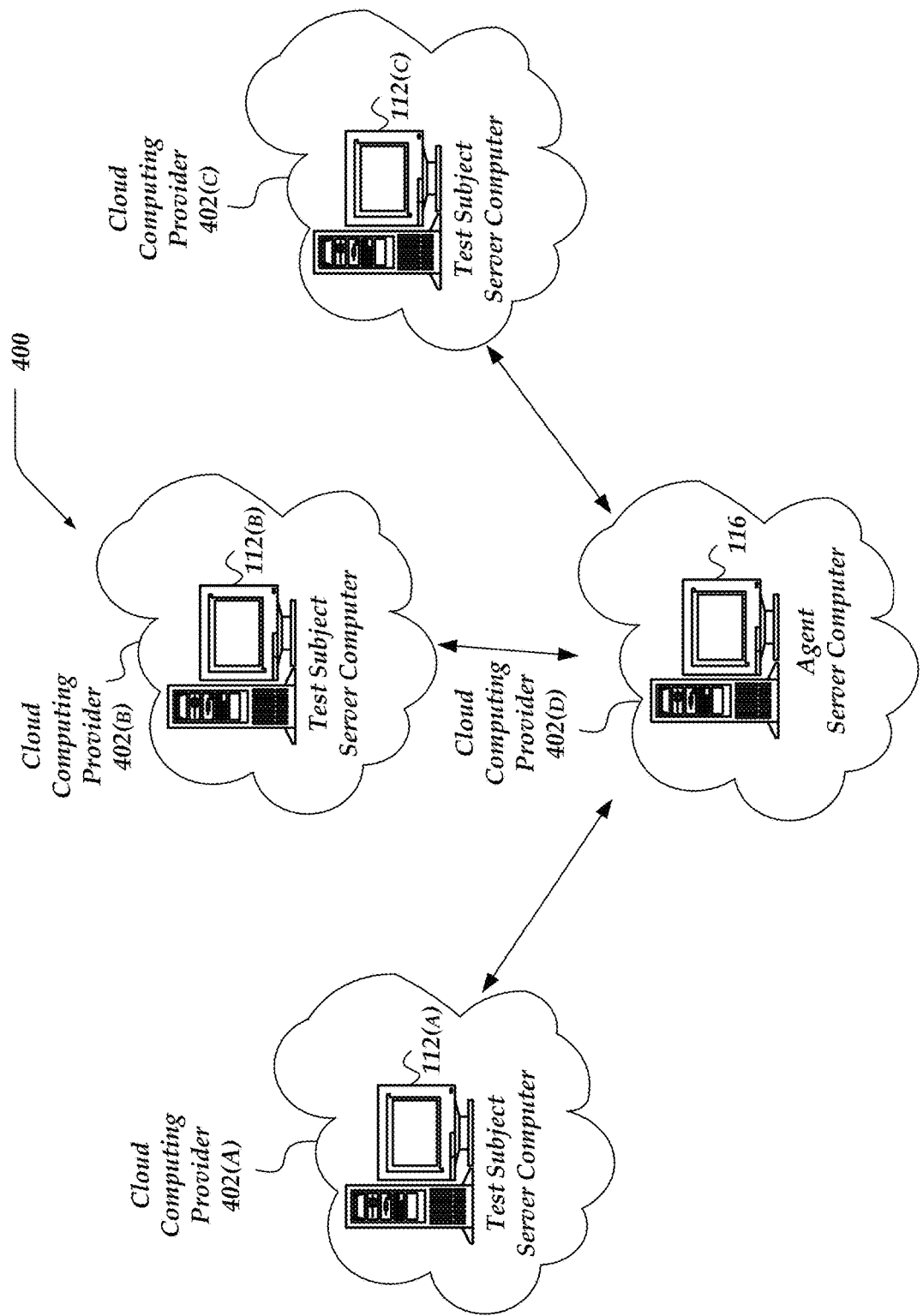
FIG. 4 shows one embodiment of a system of agent server computers and test subject computers in various cloud computing environments.

FIG. 4 shows one embodiment of a system of agent server computers and test subject computers in various cloud computing environments. Cloud computing providers 402(A)-402(D) represent computing environments, often commercially maintained, comprising computing infrastructure and a software model for enabling ubiquitous access to shared pools of configurable resources (e.g., computer networks, servers, storage, applications and services) which can be rapidly provisioned with minimal management effort, often over the Internet. Cloud computing allows users, and enterprises, with various computing capabilities to store and process data in either a privately owned cloud, or on a third-party server located in a data center in order to make data accessing mechanisms more efficient and reliable. Cloud computing relies on sharing of resources to achieve coherence and economy of scale, similar to a utility.

FIG. 4 depicts multiple test subject server computers 112(A)-(C), each hosted by a different cloud computing provider 402(A)-(C). Cloud computing providers often provide hosting in datacenters across the country and around the world. Additionally, cloud computing providers may enable a private cloud installation hosted by a private organization.

Each cloud provider 402 may represent a particular organization (e.g. Microsoft® Azure®, Amazon® Web Services, etc.), a particular region (e.g. "us-east-1", in Northern Virginia, the default region for AWS), or a particular region of a particular organization (e.g. AWS "us-west-2", located in Oregon). By distinguishing between providers and regions, agent server computer 116 gathers metrics on web APIs hosted in a variety of environments, enabling quality scores to be generated for the various cloud computing providers and regions.

FIG. 4 also depicts agent server computer 116 as hosted in cloud computing provider 402(D). By hosting agent server computer 116 in a cloud environment, end users are enabled to test web APIs from various locations around the world.

Research into the cause of inefficient web APIs has shown that, often, in addition to concerns about inadequate capacity, improper algorithms, etc, provisioning cloud computing resources in a sub-optimal geographic location contributes to poor performance. For example, us-east-1 is the default AWS region, and so organizations will often provision resources from this region without further consideration. However, invoking a web API in Northern Virginia from Japan may lead to high latency, no matter how efficient the algorithm or how powerful the provisioned computing resources.

By generating confidence scores for APIs hosted in different cloud computing providers, as depicted in FIG. 4, end users are enabled to diagnose latency, throughput, reliability, and other issues related to the geography and/or provider.

Figure 5:
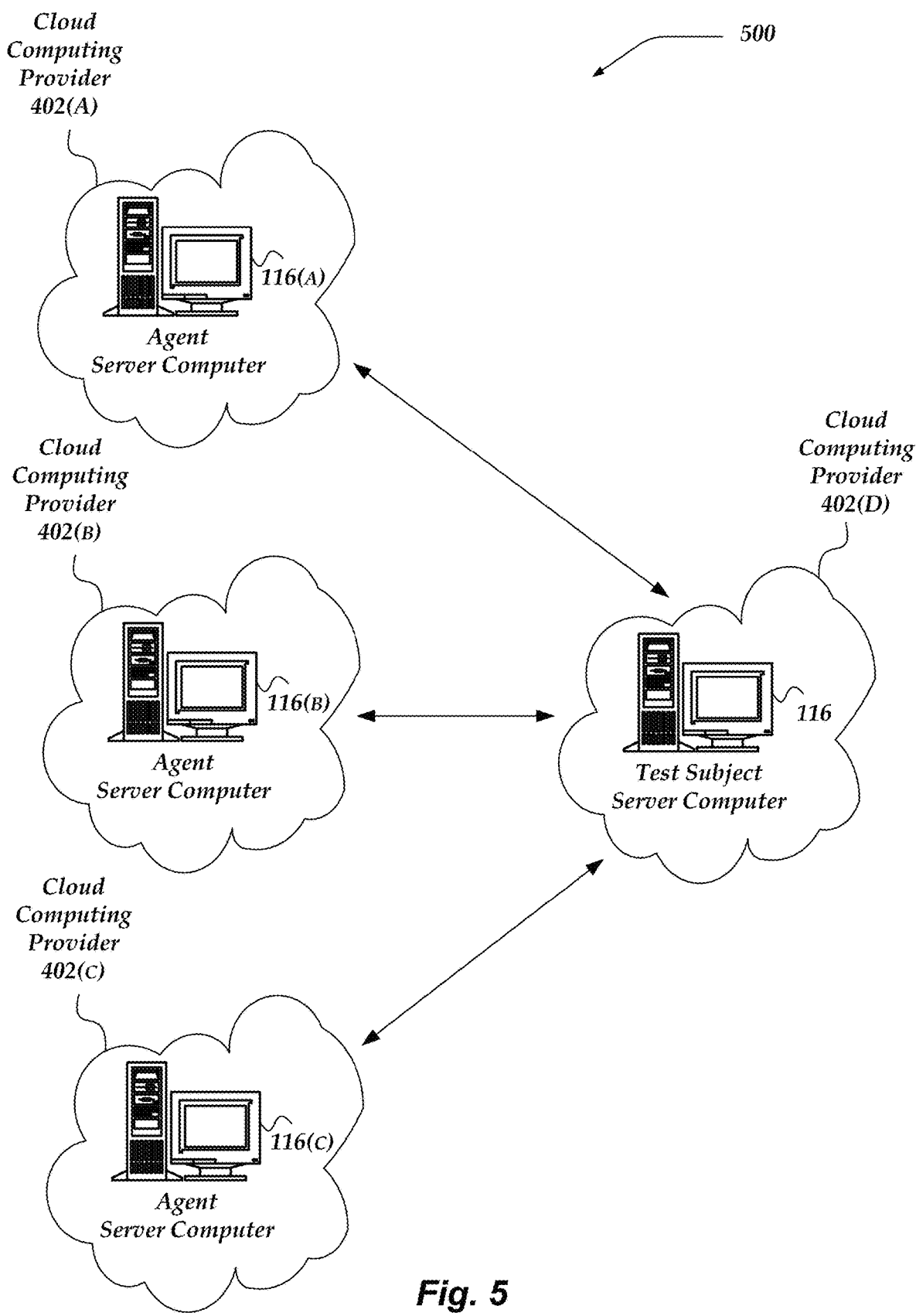
FIG. 5 shows one embodiment of another system of agent server computers and test subject computers in various cloud computing environments.

FIG. 5 shows one embodiment of another system of agent server computers and test subject computers in various cloud computing environments. Specifically, FIG. 5 illustrates a single test subject computer 116 hosted in cloud computing provider 402(D) being invoked and monitored by agent server computers 116(A)-(C), where each agent server computer 116(A)-(C) is hosted by one of cloud computing providers 402(A)-(C).

By generating confidence scores for different cloud computing providers, as depicted in FIG. 5, end users are enabled to diagnose latency, throughput, reliability, and other issues related to the geography and/or provider.

Figure 6:
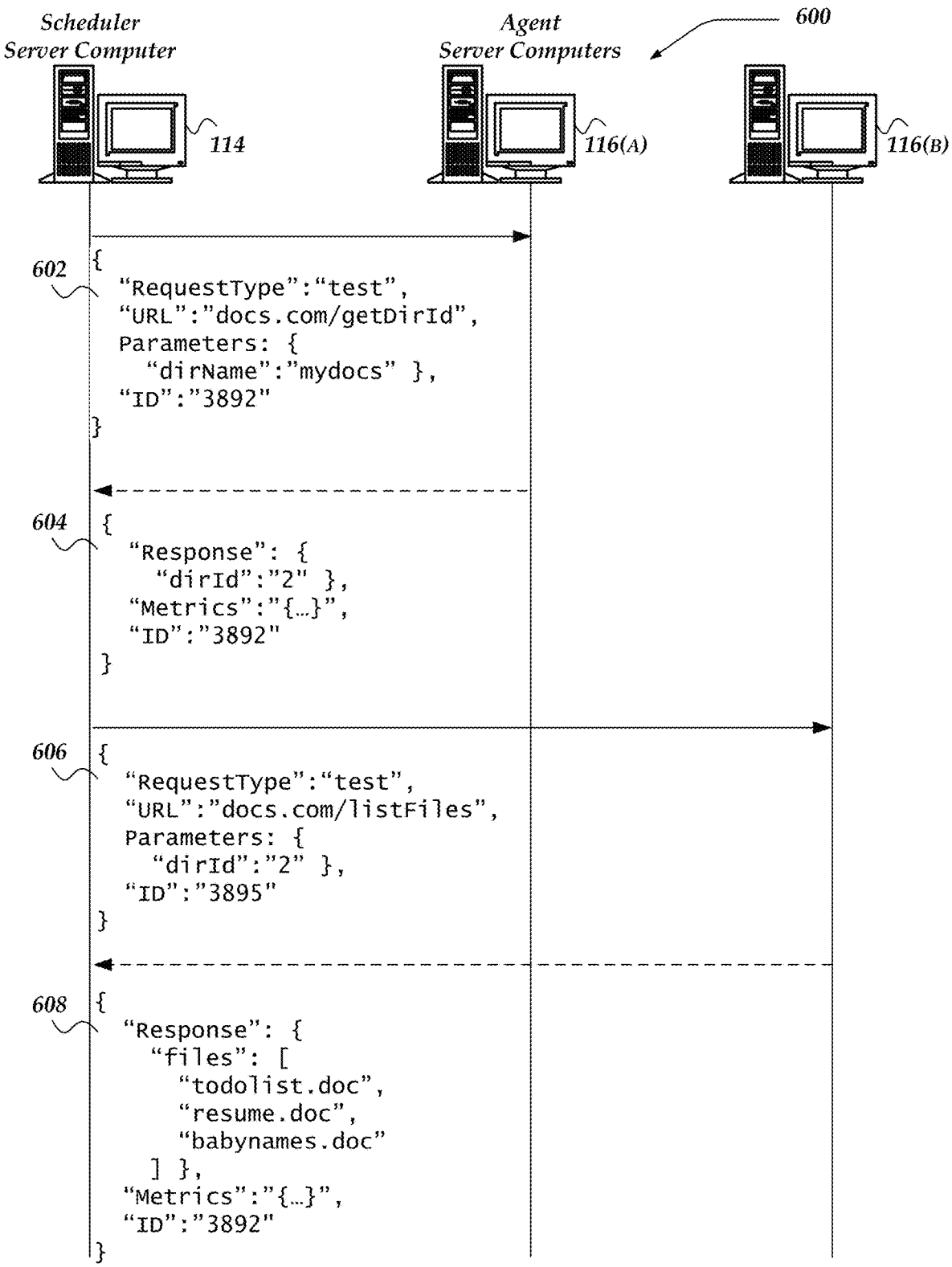
FIG. 6 shows a sequence diagram of an API test workflow.

FIG. 6 shows a sequence diagram of an API test workflow. In one or more of the various embodiments, FIG. 6 illustrates scheduler server computer 114 processing an API test workflow between agent server computers 116(A) and 116(B). FIG. 6 includes example JSON passed between the computers. While JSON is used in this illustration, JSON is but one type of object representation usable to web APIs—XML, binary, and other formats are similarly contemplated.

In one or more of the various embodiments, a workflow represents two or more web API calls in which the result of one API is an input to a subsequent API. Testing these scenarios is crucial, as tests of individual APIs often miss interactions between APIs. For example, the illustrated workflow depicts listing files from a directory.

In one or more of the various embodiments, JSON 602 illustrates a request to invoke and monitor a "getDirId" web API. Scheduler server computer 114 may, in one embodiment, generate request 602 in response to user input through web browser 224, as a result of a scheduled test, or the like.

Request 602 depicts attributes commonly associated with invoking a web API. However, these attributes are merely illustrative—additional attributes are similarly contemplated, while some or all of the depicted attributes may be omitted.

The "RequestType" attribute, in this case set to "test", is an attribute indicating what the request is for. "test" indicates that an invocation and monitoring of a web API is requested, including returning the results to the calling scheduler server computer 114. Other request types include status checks, data scrapes, etc.

The "URL" attribute, in this example set to "docs.com/getDirId", indicates the URL of the web API to be invoked. The URL may include a REST based web API invocation, although other embodiments using SOAP, DCOM, and other remoting models are similarly contemplated.

The "parameters" attribute, in this example set to "{ "dirName":"mydocs"} represents any parameters to be passed to the web API. In this example, a directory name ("mydocs") is specified. Any number of parameters is similarly contemplated, including zero parameters. Upon receipt of request 602, agent server computer 116(A), in one embodiment, invokes the specified web API on a test subject computer 112 (not shown), passing in the parameters listed in the "parameters" attribute.

The "ID" attribute, in this example set to "3892", enables scheduler server computer 114 to track and utilize the return value of the "getDirId" invocation. The "ID" attribute is included by agent server computer 116(A) into a response message, such as response message 604. This enables scheduler server computer 114 to associate return values with the corresponding web API test workflow. Continuing the example, response message 604 includes a parameter "ID" set to "3892". This enables scheduler server computer 114 to include "dirId":"2" in request message 606.

In one or more of the various embodiments, request message 606 is transmitted to agent server computer 116(B). However, in another embodiment, agent server computer 116(A) and agent server computer 116(B) are implemented by the same device. Request message 606 also contains attributes indicating a "test" is to be performed by invoking a web API at the indicated "URL" and by passing in the indicated "Parameters".

Upon completion of the listFiles web API, agent server computer 116(B) transmits response message 608 to the scheduler server computer 114.

In one or more of the various embodiments, metrics from individual components of a workflow are aggregated/combined for the purpose of generating a quality score. For example, latency can be added, throughput averaged, error/warning codes appended, etc.

FIG. 7 shows a matrix 702 of raw metrics 703 captured for a plurality of APIs 704, such as GetCurrentTime 706, ListDirectories 708, and ListFiles 710. In one or more of the various embodiments, agent server computer 116 records raw metrics 703 of invoked web APIs 704. The web APIs and raw metrics depicted are examples, and any other web API, as well as any other type of raw metric, is similarly contemplated.

In principle, a raw metric may have an arbitrary form. The value of the metric may or may not have dimensions. For example, the dimension of latency 712 is units of time (in this example, milliseconds). Outlier frequency 714 has a dimension of units of frequency (in this example, a number of outliers encountered per week or per month). Other raw metrics, such as the number of cloud services used in a period 716 are dimensionless. A non-exhaustive list of dimensions includes:

Absolute and linear metrics such as mean latency: an API with a mean latency of 200 ms has half the mean latency of one with a mean latency of 400 milliseconds.

Relative and linear metrics: if an arbitrary datum were used.

Non-linear metrics, where the significance in the difference in value between two measurements of a metric depends on the value of the measurements.

Ordinal metrics, where the value is purely a ranking, depicted by ranking metric 718.

In one or more of the various embodiments, all records associated with a particular time period can be selected from the database and the various raw metrics calculated for the time period. For example, a raw metric such as the mean latency of all the calls for the time period can be calculated.

Figure 8:
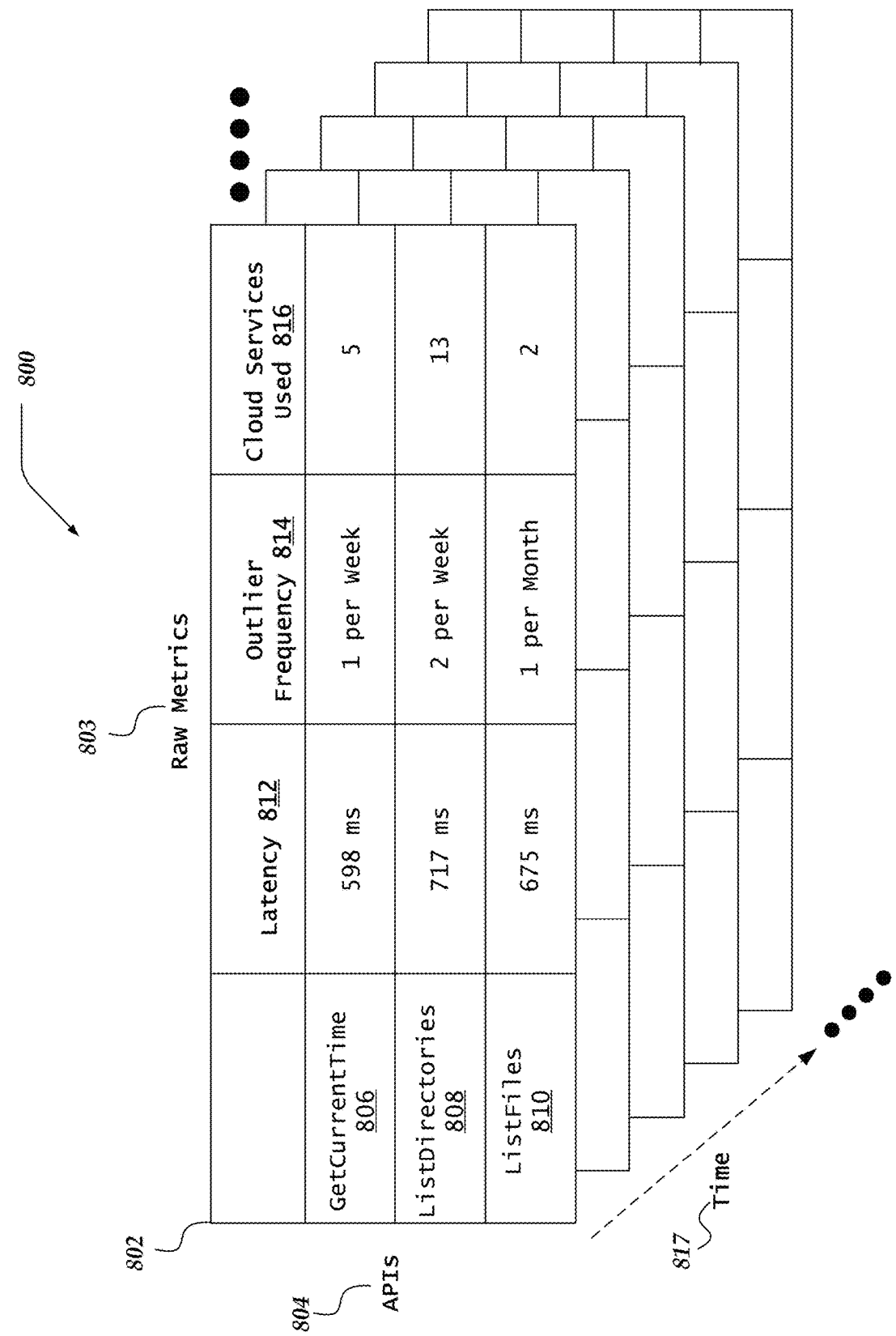
FIG. 8 shows a three dimensional matrix of raw metrics captured for a plurality of APIs over time.

FIG. 8 shows a three dimensional matrix 802 of raw metrics 803 captured for a plurality of APIs 804 over time 817. Web APIs GetCurrentTime 806, ListDirectories 808, and ListFiles 810 are merely representative of any number and type of web API. In one or more of the various embodiments, web APIs 806, 808, and 810 may have raw metrics recorded on each table in the three dimensional matrix. However, not every web API may have a value represented on every table. Similarly, while raw metrics for latency 812, outlier frequency 814, and cloud service used 816 are depicted for each of web APIs 806, 808, and 810, in other embodiments raw metrics may be omitted or missing from some or all of the web APIs listed.

Generalized Operations

FIGS. 9-12 represent the generalized operations for continuous monitoring for performance evaluation of service interfaces in accordance with at least one of the various embodiments. In one or more of the various embodiments, processes 900, 1000, 1100, and 1200 described in conjunction with FIGS. 9-12 may be implemented by and/or executed on a single network computer, such as network computer 300 of FIG. 3. In other embodiments, these processes or portions thereof may be implemented by and/or executed on a plurality of network computers, such as network computer 300 of FIG. 3. However, embodiments are not so limited, and various combinations of network computers, client computers, virtual machines, or the like may be utilized.

Figure 9:
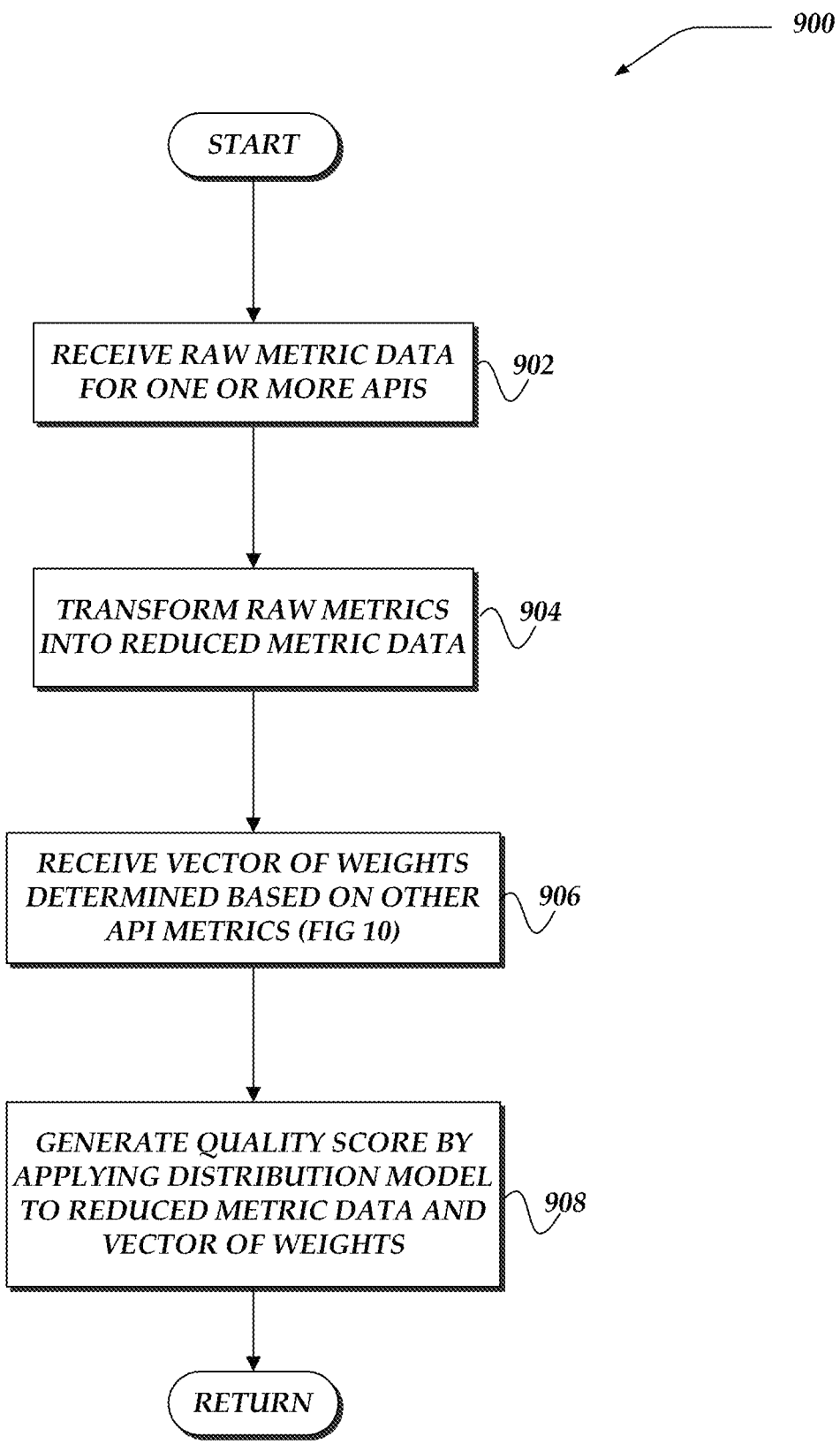
FIG. 9 shows a flowchart for a process for generating an API consistency score given raw metrics associated with the API.

FIG. 9 illustrates an overview flowchart for process 900 for continuous monitoring for performance evaluation of service interfaces, in accordance with one or more of the various embodiments. After a start block, at block 902, in one or more of the various embodiments, raw metric data is received for one or more APIs. In one or more of the various embodiments, the raw metric data is received from a data store, and includes historically captured data about previous invocations of the one or more web APIs.

A metric is "raw" if it is the result of a measurement, without having been modified, smoothed, or otherwise altered. One example of a raw metric is a mean latency of a web API invocation, measured in milliseconds. A latency may be measured from when an HTTP GET command is sent until an HTTP response is received. However, other latencies are also considered, such as a time required to perform a Domain Name System (DNS) resolution, Transport Layer Security (TLS) initiation, and overall latency, or the like. As discussed above with regard to FIG. 7, other types of raw metrics include counts (i.e. cardinal numbers), such as a number of invocation attempts, or a number of cloud services used, a number of outlier invocations, or the like.

In one or more of the various embodiments, an agent server computer invokes an API multiple times, and metrics are recorded for each invocation. In this way, a history of invocation data is collected for analysis. Furthermore, raw metric data may be captured for different APIs, where each API has at least some metrics in common with other monitored APIs. In some embodiments, the same metrics are recorded for each of the monitored APIs.

In one or more of the various embodiments, for each call of an API test, a record of raw metric data associated with the call is recorded in a database. All records associated with a particular time period can be selected from the database and the various raw metrics calculated for the time period, for instance, by obtaining the mean latency of all the calls for the time period.

Raw metric data can be stored in the database in a number of ways. In one or more of the various embodiments, a collection of N APIs for each of which the values of M raw metrics have been calculated for time period p form a matrix $R_p$. The element $m_{n,i}$ of $R_p$ is the $i^{th}$ raw metric of the $n^{th}$ API for time period p.

At block 904, in one or more of the various embodiments, raw metrics are transformed into reduced metric data. In order to transform the raw metrics contained in matrix $R_p$, a transformation function $\mathcal{F}$ is calculated. One of the various embodiments calculates a vector $Q_p$, the $n^{th}$ element of which is the overall, blended quality $q_{n,p}$ of the $n^{th}$ API for time period p. This is, in principle, given by $$Q_p = \mathcal{F} \, FR_p, \tag{1}$$

where $\mathcal{F}$ is the appropriate transformation function. However, when the different raw metrics are non-commensurate, a calculation as indicated by equation (1) is not possible. Instead, each raw metric is transformed to a reduced metric, in which each metric is commensurate with the other metrics. This allows metrics defining latency to be evaluated with metrics defining a ranking, a count of the number of cloud resources used, etc. In some cases, the appropriate transformation might be multiplication by a constant of proportionality. In other cases, it might be normalizing the metric in some way or performing a more complicated transformation. The element of the $\mu_{n,i}$ matrix of reduced metrics $S_p$ is the $i^{th}$ reduced metric of the $n^{th}$ API for time period p where $$S_p = \mathcal{G} R_p, \tag{2}$$

and $\mathcal{G}$ is the appropriate transformation function.

At block 906, in one or more of the various embodiments, a vector of weights $W_p$ is received. In one or more of the various embodiments, a linear regression can be applied to the vector of weights $W_p$ and $S_p$ to determine $Q_{n,p}$ (where $Q_{n,p}$ represents a matrix of quality scores for a given API n for a given time period P):

$$Q_{n,p} = S_p W_p. \quad (3)$$

However, because none of the values of the blended, overall quality are known a priori, it is not possible to determine $W_p$ from the received raw metric (or reduced metric) data. A discussion of how $W_p$ can be determined appears below in conjunction with FIG. 10.

At block 908, in one or more of the various embodiments, a robust estimate of the value of the overall, blended quality for each of the APIs in the collection in the time period under consideration, is determined. In one embodiment, linear regression techniques are be applied to determine the vector of weights $W_p$. However, neural networks and other artificial intelligence techniques may be used to determine weights $W_p$ based on the reduced metrics.

Once $W_p$ has been calculated based on metrics captured from a first collection of web API invocations, the overall, blended quality of a new API can be calculated quickly, using linear regression, for any API not in the original collection for any time period in which the appropriate raw metrics of the new API are available. In this way, an estimate for the overall, blended quality of a new API is generated based on a large collection of historical API test call data. Organizations can use the overall, blended quality with the assurance that it represents the best practical measure of the behavior of the API.

Next, control may be returned to a calling process.

Figure 10:
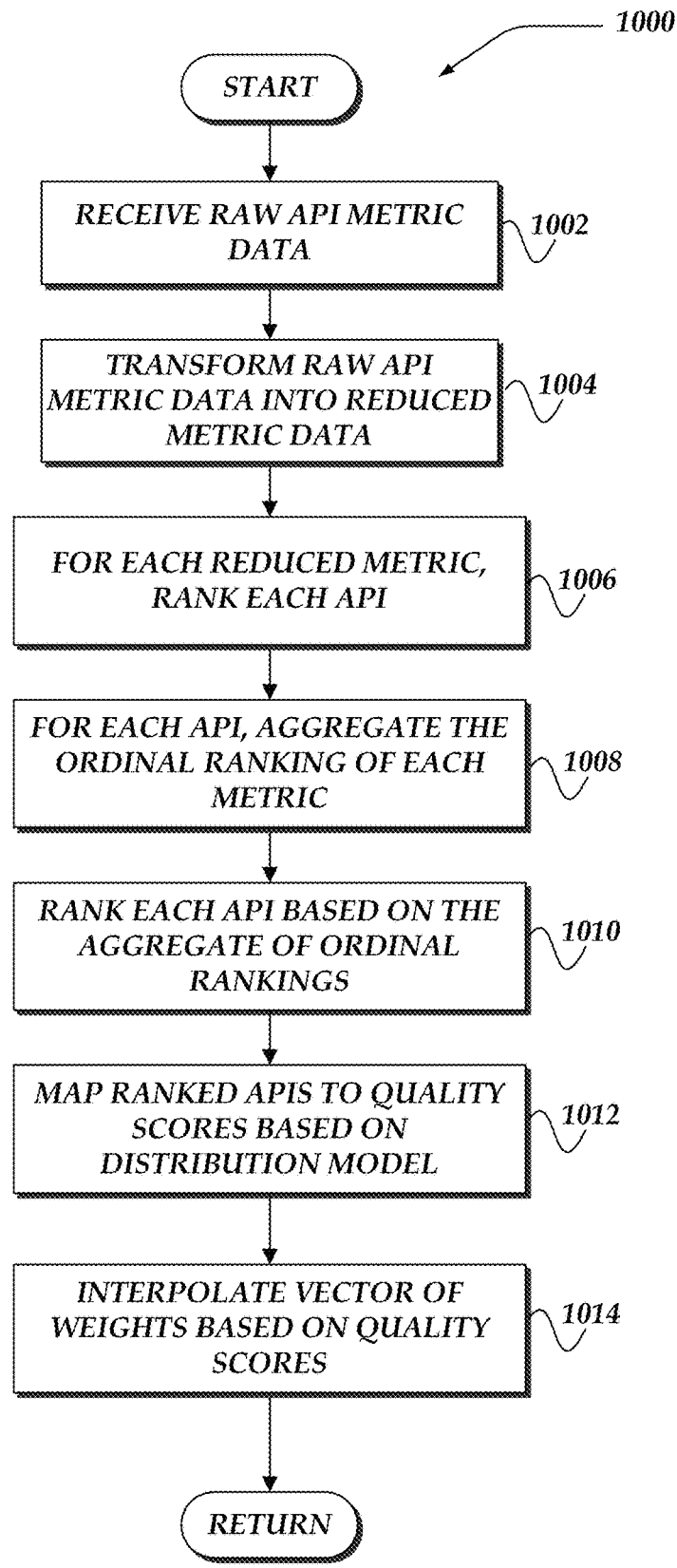
FIG. 10 shows a flowchart for a process for calculating a vector of weights for use in generating an API consistency score.

FIG. 10 shows a flowchart for a process for calculating a vector of weights for use in generating an API consistency score. In one embodiment, transformation function $\mathcal{G}$, as discussed above with regard to equation 2, is determined. In one embodiment the transformation function $\mathcal{G}$ reliably produces a value of the overall blended quality that accurately captures the intuitions and insights that a skilled human would be able to determine from close examination of the available data describing the behavior of the API. In one embodiment, a machine learning method is iteratively applied to a large collection of historical API datasets so that the best combination of functions and weights is arrived at. The transformation function $\mathcal{G}$ will be the combination of a number of other functions that carry out appropriate successive transformations on the original matrix $R_p$.

After a start block, at block 1002, in one or more of the various embodiments, raw metric data is received for one or more APIs. In one or more of the various embodiments, the raw metric data is received from a data store, and includes historically captured data about previous invocations of the one or more web APIs.

At block 1004, in one or more of the various embodiments, raw API metric data is transformed into reduced metric data, similar to the transformation discussed above with regard to 904 of FIG. 9.

At block 1006, in one or more of the various embodiments, for each reduced metric, each API is ranked, with the $1^{st}$, or highest rank, being deemed the best or most desirable rank for a metric, with lower ranks having higher ordinal value. For example, metrics concerning latency are ranked from lowest (i.e. best latency) to highest (i.e. worst latency).

In one embodiment, this matrix of rankings can optionally be multiplied by a vector of weights to increase or decrease the impact of a given metric. For example, latency may be deemed a more important metric, and so the latency ranking may be multiplied by a fractional number, e.g. ½, to artificially lower its rank. Similarly, metrics that are deemed less important have their ranks multiplied by a number greater than 1, thereby increasing their rank.

At block 1008, in one or more of the various embodiments, for each API, a sum of the ordinal ranking of each metric is calculated. Note that an API that is ranked first or last for every reduced metric would necessarily be the best or worst API in terms of quality.

At block 1010, in one or more of the various embodiments, each API is ranked based on the sum of the ordinal ranking of each metric. In one or more of the various embodiments, an overall ranking of the APIs can then be constructed and the quality score determined by assigning a quality score of 0 to the lowest ranking API and a score of 1000 to the highest and then linearly interpolating the scores based on position.

$Q_{n,p}$, the raw, overall, blended quality score for the $n^{th}$ API in time period p, is scaled to give a value between 0 and 1000 and rounded to the nearest whole number. However, other ranges of values are similarly contemplated, such as 0 to 100, etc. Value between 0-1000 are convenient and familiar to human end users—they can be thought of as being similar to a credit rating.

At block 1012, in one or more of the various embodiments, ranked APIs are mapped to quality scores based on a distribution model. Continuing the example, the APIs have been scaled to a quality score between 0 and 1000 (with any numeric range similarly contemplated). Often, the underlying phenomena, such as latency, occurs in a normal distribution (which may or may not be the case). However, the process of ranking APIs and mapping the ranking to a quality score between 0-1000 generates a uniform distribution of quality scores. So, in one embodiment, a Gaussian weighting is applied to the raw quality scores to produce a transformed quality score that is normally distributed in the range 0-1000, with a mean/median/mode score of 500.

However, practical experience suggests that most APIs can generally be considered to have good performance. Therefore it is more appropriate to apply a skewed Gaussian weighting with a modal value chosen to reflect operational convenience. A value of 800 for the mode is considered reasonable based on practical experience.

At block 1014, in one or more of the various embodiments, vector of weights $W_p$ is calculated by interpolating what weights best map the reduced API metric data discussed in step 1004 to the quality scores discussed above with regard to step 112. In one or more of the various embodiments, this interpolation is performed by applying linear regression as in equation (3) above. However, other methods of interpolation are similarly contemplated, including a neural net or other systems of machine learning, to determine the appropriate parameters/weightings.

The calculation of a quality score can be in practice a computationally intensive exercise as there could potentially be a large number (thousands or tens of thousands or more) of APIs to be handled for each weekly or monthly period, which involves calls to cloud databases that are slow and expensive in terms of the amount of money charged for the query by the cloud service provider. Therefore the quality score is calculated periodically at the beginning of each week and month, a vector of weights is extracted, and quality scores for new API invocations (or new APIs) are generated based on the vector of weights.

Consequently, a quality score alone might provide a relatively out of date view of the quality of an API. For instance, a monthly (weekly) quality score is a measure of the average quality over a particular month (week) as the score is derived from the metrics for that time period. The quality score therefore may not accurately reflect the quality in the current period.

In contrast, by determining the parameters/weightings for the machine learning model, it is then possible to use the parameters/weightings to make a prediction of the quality score for any period for which the metrics have been gathered/derived. It is in this way that metrics from historical API calls can be used to calculate the vector of weights $W_p$, which in turn can be applied to new metrics for new API calls (new instances of a known API or calling a new API itself). Thus it is possible to derive an estimate of the quality score for the current month (week) to date or for a period such as the last day or the last hour. For short periods, there might not be sufficient data to be able to calculate a quality score, for instance, if there have no calls made during that period or all the calls were failures with certain metrics missing. In these cases, the quality score is undefined. Furthermore, quality scores predicted from metrics that have been derived from fewer results will necessarily display greater volatility.

Next, control may be returned to a calling process.

Figure 11:
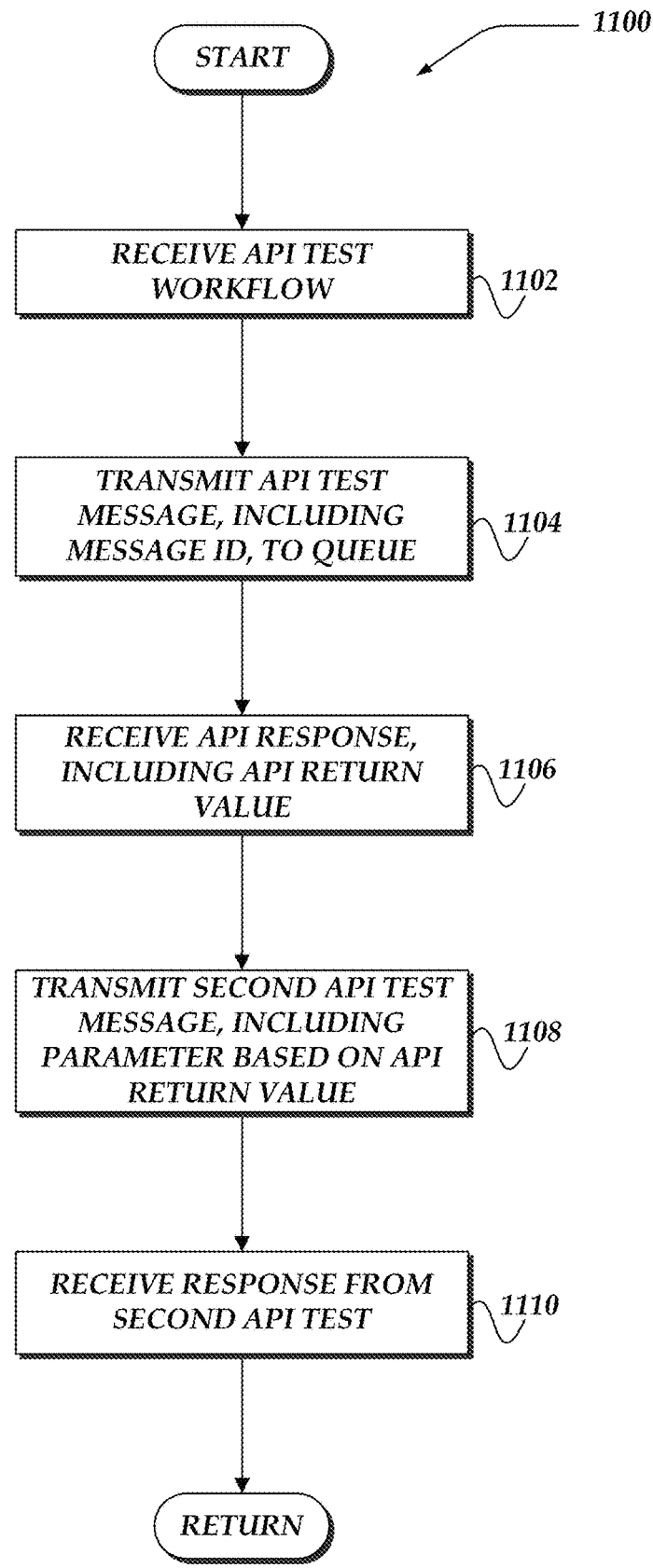
FIG. 11 shows a flowchart for a process for performing an API test workflow.

FIG. 11 shows a flowchart for a process for performing an API test workflow. After a start block, at block 1102, in one or more of the various embodiments, an API test workflow is received. In one or more of the various embodiments, workflows are combined tests that use parameters extracted from the results of one API test call as input for the next test call. For example, a workflow may invoke web APIs to list files in a directory of an online file storing service. The workflow may invoke an API to, given a directory name, return a directory ID, followed by invoking an API to, given a directory ID, return a list of files.

At block 1104, in one or more of the various embodiments, an API test message, including a message ID field, is transmitted from a scheduler server computer 114 to an agent server computer 116. In one or more of the various embodiments, the API test message is posted to a message queue, such as an Azure® Service Bus or an AWS SQS instance. By passing the message ID, the agent server computer 116 that processes API invocation and monitoring is enabled to return the message ID, along with the return value of the API and the raw API metrics collected during invocation.

At block 1106, in one or more of the various embodiments, an API response is received, including an API return value and the message ID discussed above with regard to step 1104. With the message ID, the scheduler server compute 114 is able to determine that the instant API invocation is part of a workflow.

At block 1108, in one or more of the various embodiments, scheduler server computer 114 transmits a second API test message, including a parameter based on the API return value received in step 1106. In one or more of the various embodiments, scheduler computer knows to use the API return value as a parameter based on a user-supplied definition of the workflow.

At block 1110, in one or more of the various embodiments, scheduler server computer 114 receives a response from the second API test. In one or more of the various embodiments, raw metrics of an API test workflow are aggregated for analysis by the process described above with regard to FIGS. 9 and 10.

Next, control may be returned to a calling process.

Figure 12:
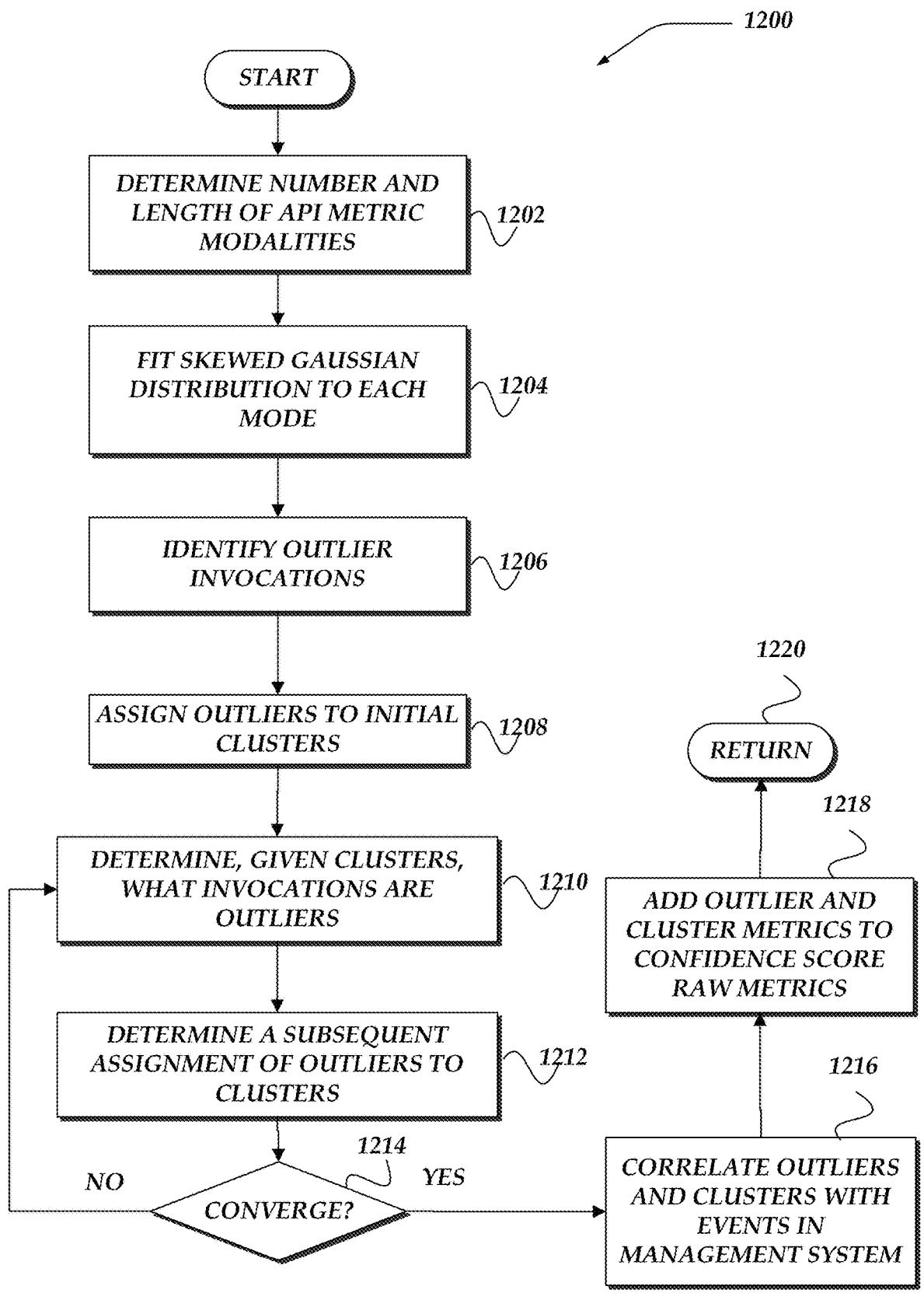
FIG. 12 shows a flowchart for a process for identifying outliers and clusters of outliers.

FIG. 12 shows a flowchart for a process for identifying outliers and clusters of outliers. As discussed above, by outlier is meant an API test call with an unusually long or short latency. By a cluster is meant a cluster of outliers. By multimodality is meant the observation that many APIs are observed to have several peaks in their histogram of call latencies in contrast to the expectation of a well-behaved API that it display a single peak that can be well described with a Gaussian distribution or moderately skewed Gaussian distribution. Recognizing multimodality is a key to determining whether a particular result is an outlier. Typically, outliers are expected to have latencies greater than the mode with longest average latency. However, as it is possible to short outliers for unimodal distributions, as well as intermodal outliers.

Outliers are often produced by issues with network infrastructure and configuration (including Domain Name Service, load balancing, routing) or the subsystem serving the API request. As these issues are often persistent or recurrent over significant timescales (that can vary from minutes to weeks), outliers are often observed to belong to natural, relatively well-defined clusters. Detecting a cluster of outliers is often an indication of an underlying problems with the API.

An historical set of time series data consists of a time-stamped set of metrics for each test call. These metrics include the overall latency and also, when available, the latencies of the various component operations of the call. Further analysis can also be made on the basis of the hosting service (cloud or physical) and location of both the requesting and serving systems. In the following discussions, unless specified otherwise, it will be assumed that dataset consists of results for all locations combined.

After a start block, at block 1202, in one or more of the various embodiments, a number of modalities—e.g. the number of groupings of API metric values—is determined for a given set of historical API metric data. In one or more of the various embodiments, a supervised or unsupervised machine learning technique is used to determine the number of modalities and the length of each modality.

At block 1204, in one or more of the various embodiments, a skewed Gaussian (i.e. normal) distribution is fit to each of the modes. If the API metrics are unimodal, there will be a single mode.

At block 1206, in one or more of the various embodiments, outlier invocations are identified. In one embodiment an outlier may be an invocation that had a higher latency, i.e. it took longer for the API to return. However, an outlier may be defined in other ways, such as a lower latency (a possible indication that expected processing did not take place).

At block 1208, in one or more of the various embodiments, a first assignment of outliers to clusters is made. In one or more of the various embodiments, this assignment is based on supervised or unsupervised machine learning techniques.

At block 1210, in one or more of the various embodiments, a determination is made which API invocations are outliers. On the first execution, when block 1210 executes subsequent to block 1208, the determination is made considering the initial assignment of outliers to clusters as described above with regard to step 1206. In one or more of the various embodiments, the probability that a result is an outlier depends on the proximity to a cluster.

At block 1212, in one or more of the various embodiments, an assignment of outliers to clusters is generated. The process proceeds to decision block 1214, where a determination of convergence occurs. If outliers have converged into clusters—or at least remained stable, then the process proceeds to step 1216. Otherwise, the process continues by executing step 1210 again. In one or more of the various embodiments, convergence is determined to occur when the identified outliers and clusters are consistent between iterations.

At block 1216, in one or more of the various embodiments, a correlation is identified between outlier API invocations with regard to clusters, and how the outlier API invocations correlated with the event management system. For example, a 3$^{rd}$ party event management system may know of a power outage that affected the API's DNS server around the time that DNS latencies increased. By providing this information to an end user, the root cause of the issue may be more easily determined.

At block 1218, in one or more of the various embodiments, outlier and cluster metrics are added to confidence score raw metrics. For example, ranking metric 718, as discussed above with regard to FIG. 7, may have been added to the matrix of raw metrics based on outliers and clusters identifier by scheduler server agent computer 114. These synthetic metrics are usable in the steps discussed in FIGS. 9-10 along with the measured metrics such as latency.

Next, control may be returned to a calling process.

It will be understood that each block of the flowchart illustration, and combinations of blocks in the flowchart illustration, can be implemented by computer program instructions. These program instructions may be provided to a processor to produce a machine, such that the instructions, which execute on the processor, create means for implementing the actions specified in the flowchart block or blocks. The computer program instructions may be executed by a processor to cause a series of operational steps to be performed by the processor to produce a computer-implemented process such that the instructions, which execute on the processor to provide steps for implementing the actions specified in the flowchart block or blocks. The computer program instructions may also cause at least some of the operational steps shown in the blocks of the flowchart to be performed in parallel. Moreover, some of the steps may also be performed across more than one processor, such as might arise in a multi-processor computer system. In addition, one or more blocks or combinations of blocks in the flowchart illustration may also be performed concurrently with other blocks or combinations of blocks, or even in a different sequence than illustrated without departing from the scope or spirit of the invention.

Accordingly, blocks of the flowchart illustration support combinations of means for performing the specified actions, combinations of steps for performing the specified actions and program instruction means for performing the specified actions. It will also be understood that each block of the flowchart illustration, and combinations of blocks in the flowchart illustration, can be implemented by special purpose hardware based systems, which perform the specified actions or steps, or combinations of special purpose hardware and computer instructions. The foregoing example should not be construed as limiting and/or exhaustive, but rather, an illustrative use case to show an implementation of at least one of the various embodiments of the invention.

Further, in one or more embodiments (not shown in the figures), the logic in the illustrative flowcharts may be executed using an embedded logic hardware device instead of a CPU, such as, an Application Specific Integrated Circuit (ASIC), Field Programmable Gate Array (FPGA), Programmable Array Logic (PAL), or the like, or combination thereof. The embedded logic hardware device may directly execute its embedded logic to perform actions. In one or more embodiment, a microcontroller may be arranged to directly execute its own embedded logic to perform actions and access its own internal memory and its own external Input and Output Interfaces (e.g., hardware pins and/or wireless transceivers) to perform actions, such as System On a Chip (SOC), or the like.

What is claimed as new and desired to be protected by Letters Patent of the United States is:

1. A method for monitoring service interfaces in a network, wherein one or more processors in a network computer execute instructions to perform actions, comprising:
    employing one or more test agent engines to provide a first and a second set of raw metric data associated with one or more Application Programming Interfaces (APIs) to a test scheduling engine;
    employing the test scheduling engine to transform the first and second set of raw metric data into a first and a second set of reduced metric data; and
    employing a quality score engine to perform further actions, including:
        aggregating one or more ordinal ranks for each of the one or more APIs based on the first set of reduced metric data, wherein each of the one or more ordinal rankings is associated with one or more characteristics of the first set and second set of reduced metric data;
        ranking each of the one or more APIs based on their aggregations of the ordinal ranks;
        providing a quality score based on a mapping of the ranked APIs to a first distribution model; and
        generating a second quality score based on the mapping and the second set of reduced metric data.

2. The method of claim 1, employing the one or more test agent engines to invoke the one or more APIs, wherein the one or more APIs are hosted remote from the one or more test agent engines.

3. The method of claim 1, wherein generating the second quality score, further comprises:
    interpolating an array of quality scores for the second set of reduced metric data based on the vector of weights using a linear regression model; and
    retrieving the second quality score from the array of quality scores for a given API and a given time period.

4. The method of claim 1, wherein the second set of raw metric data is associated with an API that is separate from the APIs associated with the first set of raw metric data.

5. The method of claim 1, further comprising employing the one or more APIs to perform actions, including:
    executing a workflow that includes a sequence of API invocations;
    providing one or more return values for each API invocation; and
    employing the one or more return values as one or more parameters in a subsequent API invocation as defined in the workflow.

6. The method of claim 1, wherein providing the first and second set of raw metric data, further comprises, providing one or more of latency, availability, outliers, or clusters of outliers.

7. The method of claim 1, further comprises, employing an outlier detection engine, to perform actions, including:
    identifying, for a type of metric, one or more modalities;
    fitting one or more second distribution models to each of the one or more modalities;

identifying the one or more outliers from the one or more modalities based on a defined deviation threshold of the one or more second distribution models that are associated with the one or more modalities;
assigning the one or more outliers to one or more initial clusters; and
iteratively identifying the one or more outliers and assigning the identified outliers to the one or more clusters until a convergence is detected.

8. The method of claim 1, wherein the distribution model includes a skewed Gaussian distribution model.

9. A system for monitoring service interfaces in a network:
one or more network computers, comprising:
a transceiver that communicates over the network;
a memory that stores at least instructions; and
one or more processors that execute instructions that perform actions, including:
employing one or more test agent engines to provide a first and a second set of raw metric data associated with one or more Application Programming Interfaces (APIs) to a test scheduling engine;
employing the test scheduling engine to transform the first and second set of raw metric data into a first and a second set of reduced metric data; and
employing a quality score engine to perform further actions, including:
aggregating one or more ordinal ranks for each of the one or more APIs based on the first set of reduced metric data, wherein each of the one or more ordinal rankings is associated with one or more characteristics of the first set and second set of reduced metric data;
ranking each of the one or more APIs based on their aggregations of the ordinal ranks;
providing a quality score based on a mapping of the ranked APIs to a first distribution model; and
generating a second quality score based on the mapping and the second set of reduced metric data; and
one or more other network computers, comprising:
a transceiver that communicates over the network;
a memory that stores at least instructions; and
one or more processors that execute instructions that perform actions, including:
employing the one or more test agent engines to provide one or more sets of raw metric data associated with the one or more Application Programming Interfaces (APIs) to the test scheduling engine.

10. The system of claim 9, wherein the one or more processors of the one or more network computers execute instructions that perform further actions comprising, employing the one or more test agent engines to invoke the one or more APIs, wherein the one or more APIs are hosted remote from the one or more test agent engines.

11. The system of claim 9, wherein generating the second quality score, further comprises:
interpolating an array of quality scores for the second set of reduced metric data based on the vector of weights using a linear regression model; and
retrieving the second quality score from the array of quality scores for a given API and a given time period.

12. The system of claim 9, wherein the second set of raw metric data is associated with an API that is separate from the APIs associated with the first set of raw metric data.

13. The system of claim 9, wherein the one or more processors of the one or more network computers execute instructions that perform further actions comprising, employing the one or more APIs to perform actions, including:
executing a workflow that includes a sequence of API invocations;
providing one or more return values for each API invocation; and
employing the one or more return values as one or more parameters in a subsequent API invocation as defined in the workflow.

14. The system of claim 9, wherein providing the first and second set of raw metric data, further comprises, providing one or more of latency, availability, outliers, or clusters of outliers.

15. The system of claim 9, wherein the one or more processors of the one or more network computers execute instructions that perform further actions comprising, employing an outlier detection engine, to perform actions, including:
identifying, for a type of metric, one or more modalities;
fitting one or more second distribution models to each of the one or more modalities;
identifying the one or more outliers from the one or more modalities based on a defined deviation threshold of the one or more second distribution models that are associated with the one or more modalities;
assigning the one or more outliers to one or more initial clusters; and
iteratively identifying the one or more outliers and assigning the identified outliers to the one or more clusters until a convergence is detected.

16. The system of claim 9, wherein the distribution model includes a skewed Gaussian distribution model.

17. A network computer for monitoring service interfaces in a network, comprising:
a transceiver that communicates over the network;
a memory that stores at least instructions; and
one or more processors that execute instructions that perform actions, including:
employing one or more test agent engines to provide a first and a second set of raw metric data associated with one or more Application Programming Interfaces (APIs) to a test scheduling engine;
employing the test scheduling engine to transform the first and second set of raw metric data into a first and a second set of reduced metric data; and
employing a quality score engine to perform further actions, including:
aggregating one or more ordinal ranks for each of the one or more APIs based on the first set of reduced metric data, wherein each of the one or more ordinal rankings is associated with one or more characteristics of the first set and second set of reduced metric data;
ranking each of the one or more APIs based on their aggregations of the ordinal ranks;
providing a quality score based on a mapping of the ranked APIs to a first distribution model; and
generating a second quality score based on the mapping and the second set of reduced metric data.

18. The network computer of claim 17, further comprises, employing the one or more test agent engines to invoke the one or more APIs, wherein the one or more APIs are hosted remote from the one or more test agent engines.

19. The network computer of claim 17, wherein generating the second quality score, further comprises:
  interpolating an array of quality scores for the second set of reduced metric data based on the vector of weights using a linear regression model; and
  retrieving the second quality score from the array of quality scores for a given API and a given time period.

20. The network computer of claim 17, wherein the second set of raw metric data is associated with an API that is separate from the APIs associated with the first set of raw metric data.

21. The network computer of claim 17, further comprising employing the one or more APIs to perform actions, including:
  executing a workflow that includes a sequence of API invocations;
  providing one or more return values for each API invocation; and
  employing the one or more return values as one or more parameters in a subsequent API invocation as defined in the workflow.

22. The network computer of claim 17, wherein providing the first and second set of raw metric data, further comprises, providing one or more of latency, availability, outliers, or clusters of outliers.

23. The network computer of claim 17, further comprises, employing an outlier detection engine, to perform actions, including:
  identifying, for a type of metric, one or more modalities;
  fitting one or more second distribution models to each of the one or more modalities;
  identifying the one or more outliers from the one or more modalities based on a defined deviation threshold of the one or more second distribution models that are associated with the one or more modalities;
  assigning the one or more outliers to one or more initial clusters; and
  iteratively identifying the one or more outliers and assigning the identified outliers to the one or more clusters until a convergence is detected.

24. A processor readable non-transitory storage media that includes instructions for monitoring service interfaces in a network between one or more computers, wherein execution of the instructions by one or more processors on one or more network computers performs actions, comprising:
  employing one or more test agent engines to provide a first and a second set of raw metric data associated with one or more Application Programming Interfaces (APIs) to a test scheduling engine;
  employing a test scheduling engine to transform the first and second set of raw metric data into a first and a second set of reduced metric data; and
  employing a quality score engine to perform further actions, including:
    aggregating one or more ordinal ranks for each of the one or more APIs based on the first set of reduced metric data, wherein each of the one or more ordinal rankings is associated with one or more characteristics of the first set and second set of reduced metric data;
    ranking each of the one or more APIs based on their aggregations of the ordinal ranks;
    providing a quality score based on a mapping of the ranked APIs to a first distribution model; and
    generating a second quality score based on the mapping and the second set of reduced metric data.

25. The media of claim 24, employing the one or more test agent engines to invoke the one or more APIs, wherein the one or more APIs are hosted remote from the one or more test agent engines.

26. The media of claim 24, wherein generating the second quality score, further comprises:
  interpolating an array of quality scores for the second set of reduced metric data based on the vector of weights using a linear regression model; and
  retrieving the second quality score from the array of quality scores for a given API and a given time period.

27. The media of claim 24, wherein the second set of raw metric data is associated with an API that is separate from the APIs associated with the first set of raw metric data.

28. The media of claim 24, further comprising employing the one or more APIs to perform actions, including:
  executing a workflow that includes a sequence of API invocations;
  providing one or more return values for each API invocation; and
  employing the one or more return values as one or more parameters in a subsequent API invocation as defined in the workflow.

29. The media of claim 24, wherein providing the first and second set of raw metric data, further comprises, providing one or more of latency, availability, outliers, or clusters of outliers.

30. The media of claim 24, further comprises, employing an outlier detection engine, to perform actions, including:
  identifying, for a type of metric, one or more modalities;
  fitting one or more second distribution models to each of the one or more modalities;
  identifying the one or more outliers from the one or more modalities based on a defined deviation threshold of the one or more second distribution models that are associated with the one or more modalities;
  assigning the one or more outliers to one or more initial clusters; and
  iteratively identifying the one or more outliers and assigning the identified outliers to the one or more clusters until a convergence is detected.

* * * * *